United States Patent [19]
Abe

[11] Patent Number: 5,740,330
[45] Date of Patent: Apr. 14, 1998

[54] EXPOSURE CONTROLLING METHOD AND AN EXPOSURE CONTROLLING APPARATUS

[75] Inventor: Takuya Abe, Chiba, Japan

[73] Assignee: Sharp Kabushiki Kaisha, Osaka, Japan

[21] Appl. No.: 417,992

[22] Filed: Apr. 6, 1995

[30] Foreign Application Priority Data

Apr. 8, 1994 [JP] Japan ................................ 6-070578

[51] Int. Cl.⁶ .................................................. G06K 15/00
[52] U.S. Cl. .................................... 395/102; 382/199
[58] Field of Search ........................ 395/102, 109, 395/131, 132, 128, 101; 358/534, 535, 536, 447, 457, 458, 459, 460; 382/266, 267, 268, 269, 270, 271, 272, 274, 197, 199, 201

[56] References Cited

U.S. PATENT DOCUMENTS

| 5,299,308 | 3/1994 | Suzuki et al. | 358/456 |
| 5,404,233 | 4/1995 | Nagata et al. | 358/447 |

FOREIGN PATENT DOCUMENTS 3-33769  2/1991  Japan.

Primary Examiner—Arthur G. Evans
Attorney, Agent, or Firm—Nixon & Vanderhye P.C.

[57] ABSTRACT

Representative points are added to peripheral pixels in every black pixel groups. The thus generated representative points are joined by a curve-fitting approximation method to obtain an outlined curve for every black pixel group. One pixel is divided into a multiple number of sub-pixels. Pulse signals supplied to a laser is modulated on pulse width so that the sub-pixels (hatched section) belonging to the inside of each curve may be exposed to laser beams.

20 Claims, 35 Drawing Sheets

Fig. 8A
(Prior Art)
|   | 1 |   |
|---|---|---|
| 0 | 1 | 0 |
| 0 | 1 | 0 |
| 0 | 1 | 0 |
|   | 1 |   |
EXCEPT THE CASE
SHOWN IN FIG.4A
Fig. 8B
(Prior Art)
| 0 | 0 | 0 |   |
|---|---|---|---|
| 1 | 1 | 1 | 1 |
| 0 | 0 | 0 |   |
EXCEPT THE CASE
SHOWN IN FIG.4B
Fig. 8C
(Prior Art)
1231(7)
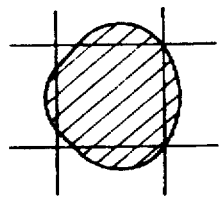
Fig. 8D
(Prior Art)
1222(7)
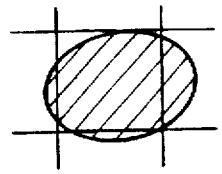

Fig. 9A
(Prior Art)
Fig. 9B
(Prior Art)
Fig. 9C
(Prior Art)
0220(4)
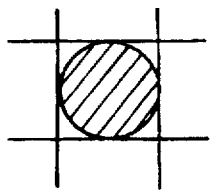
Fig. 9D
(Prior Art)
0220(4)
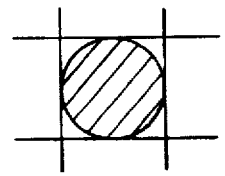

*Fig. 10A*
(Prior Art)
*Fig. 10B*
(Prior Art)
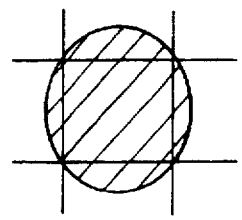
2332(10)
*Fig. 11A*
(Prior Art)
*Fig. 11B*
(Prior Art)
*Fig. 11C*
(Prior Art)
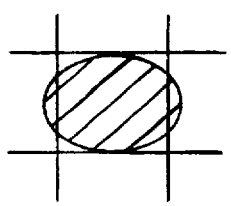
1221(6)
*Fig. 11D*
(Prior Art)
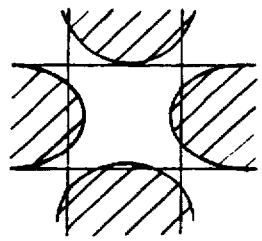
1001(2)

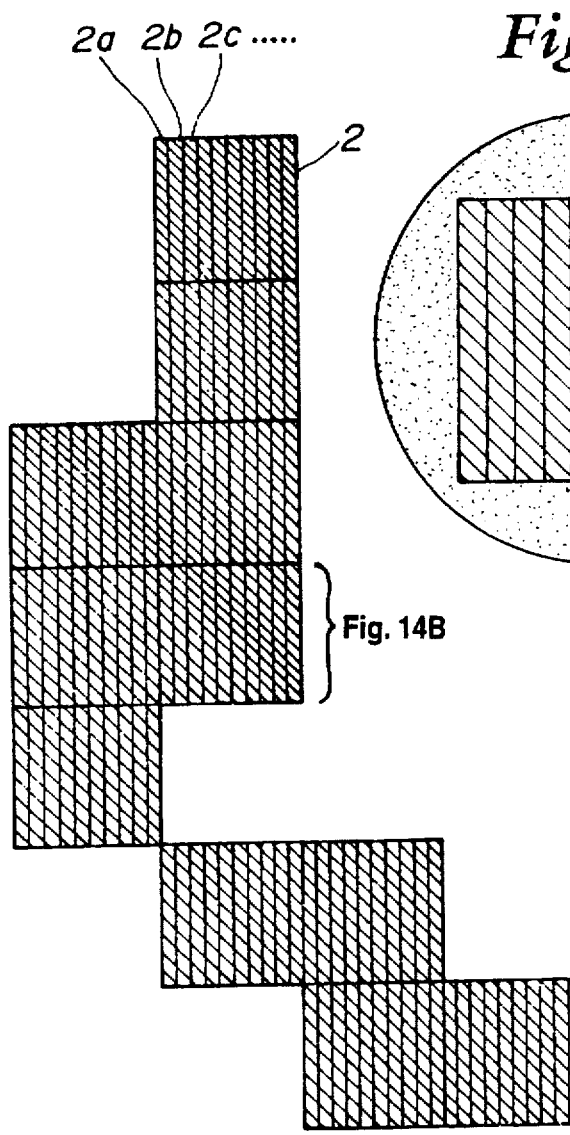
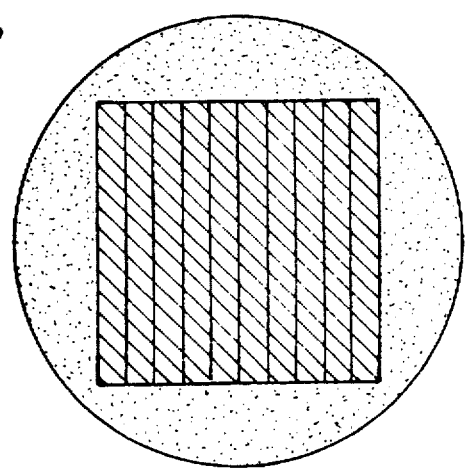
Fig. 14A
Fig. 14B

*Fig. 29A*  *Fig. 29B*
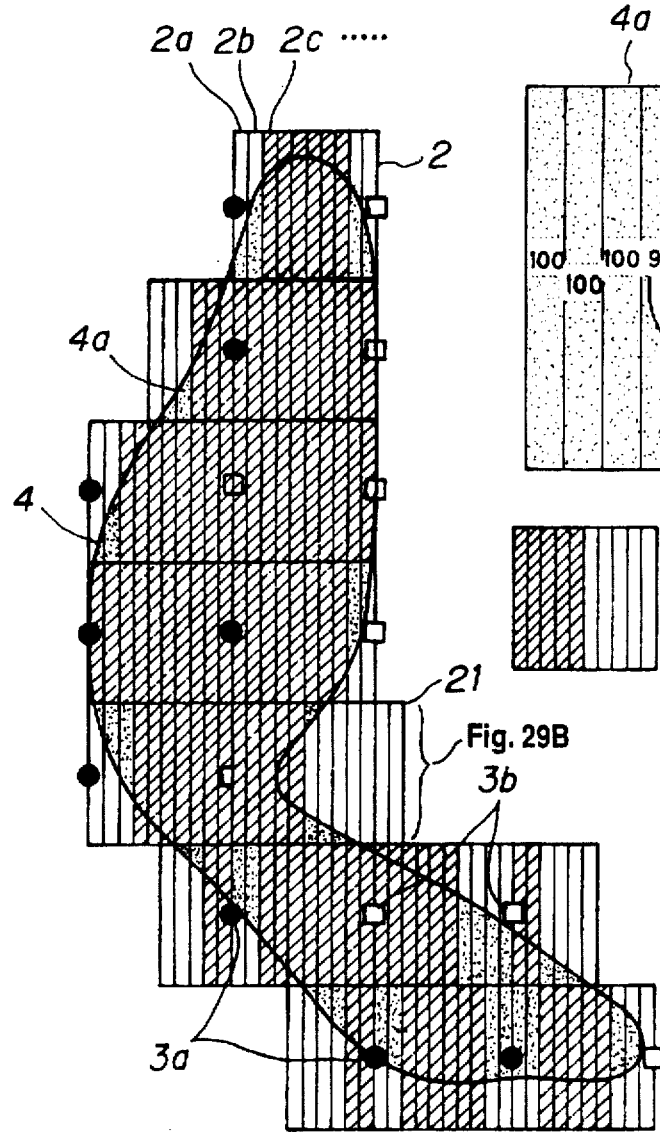

TOTAL AREA=757 ically in recording images inclusive of characters, patterns and natural images such as photographs etc.

EXPOSURE CONTROLLING METHOD AND AN EXPOSURE CONTROLLING APPARATUS

BACKGROUND OF THE INVENTION

(1) Field of the Invention

The present invention relates to an exposure controlling method and an exposure controlling apparatus for controlling laser output in laser printers etc.

(2) Description of the Prior Art

Laser printers have been widely used as an optical recording apparatus in recording images inclusive of characters, patterns and natural images such as photographs etc.

FIG. 1 shows a schematic configuration of a typical laser.

This laser printer comprises: an image forming unit 51 including a drum type photoreceptor 51a having photoconductivity, a charger 51b opposed to the photoreceptor 51a, a developing unit 51c etc., for transferring a toner image to be formed from an electrostatic latent image onto a sheet of paper; a laser unit 52 having a semiconductor laser for emitting laser beams carrying image data onto the photoreceptor 51a (or laser-exposing the photoreceptor 51a) so as to form an electrostatic latent image; a paper feeding unit 53 for feeding sheets to the image forming unit 51; a fixing unit 54 for fixing the toner image transferred on the sheet of paper; and a paper discharging unit 55 to which sheets with the image formed thereon are discharged. A reference numeral 56 designates an electric power unit for supplying electric power to the whole system of the laser printer.

For forming a static latent image, laser beams emitted from the laser unit 52 scan linearly along the axial direction of the photoreceptor 51a. This operation is called main scanning and its scanning direction is called a main scan direction. As one-line scan of the laser beams is complete, the photoreceptor 51a turns in a direction illustrated by an arrow 'a' in the figure so as to allow the laser beams to irradiate a next line. This rotation is called auxiliary scanning and its scanning direction is called an auxiliary scan direction. Thus, a static latent image can be created on the photoreceptor 51a by the combination of the two kinds of scanning.

Each line formed by the aforementioned line-scanning is constituted by a multiple number of pixels. The semiconductor laser illuminates every pixel in a predetermined time to give light energy to the photoreceptor 51a to form each of the pixels. This operation is called pixel exposure. The size of a pixel and its density are determined by adjusting the illuminating time of the semiconductor laser and its intensity of the laser beams to be outputted when each pixel is exposed by the laser beams. In conjunction with this, the illumination of the semiconductor laser is performed in the form of a series of pulses, and changing the illuminating time of each pulse is termed as pulse modulation. The intensity of the laser beam is called power and changing the power of the pulses is termed as power modulation.

When a slanting line is formed across the image area in a conventional laser printer, the edge of the line tends to become step-shaped (serrated) and this defect is called jaggy edges. Particularly, in a laser printer of low resolution, the jaggedness stands out, degrading the quality in image output.

Meanwhile, in some of pixel data processors used in conventional laser printers, in order to obtain exposure data on a certain pixel, a mass of pixels or pixel group, including the pixel in question is compared to patterns for data matching which are previously stored as pattern matching data. Each data matching pattern has predetermined exposure data. Therefore, if the mass of pixels or pixel group coincides with one of the patterns of pattern matching data, the exposure of the pixel in question is specified by the pattern matching data, whereby the jaggedness appearing in slanting lines can be alleviated.

This method is disclosed in, for example, Japanese Patent Application Laid-open Hei 3 No.33,769. According to the disclosure, pattern matching data, as will be detailed with reference to drawings and exposure data in association with each of data matching patterns are previously stored. Hereinafter, the specific method of obtaining exposure data will be detailed.

FIGS. 2A through 2D schematically illustrate a processing development of a recording pixel from a pattern signal to a recording image of the pixel. FIG. 2A shows a recording pixel area wherein a middle horizontal broken line and its arrow designated at 30 indicate a scanning line trace of the laser beams and its scan direction, respectively. In this example, the recording pixel area is divided into four sub-pixels with respect to the scan direction, so that every sub-pixel has a pattern signal. In this case, suppose that these sub-pixels are allotted with pattern signals of 0, 2, 3 and 1 in order from the left, the output of diodes (not shown) operated by the pattern signals take a state as shown in FIG. 2B. The distribution of an exposure amount on the photoreceptor in general depends on the feature of a laser beam spot used. In this case, if a laser having a vertically long elliptic beam spot (main scan direction radius: $R_x=P_y/4$ and auxiliary scan direction radius: $R_y=P_y/2$) with the size of the recording pixel area of $P_y$ square, the exposure distribution on the photoreceptor takes a form as shown in FIG. 2C. As the latent image formed by the above exposure is developed with toner, the area is binarized at a threshold of an exposure amount $E_t$ for development whereby a pattern as shown in FIG. 2D is obtained as a recording image.

Next, data for matching patterns or pattern matching data will be described. At first, consider a case of image processing for a black solid pattern. In this case, pattern matching data representing a black solid pattern is formed of a plurality of square pixels as shown in FIG. 3A, where a central pixel is the "a certain pixel" stated above. If certain data on a group of pixels representing a printing image corresponds to this pattern (the black solid pattern), exposure data on the "a certain pixel" is set up as '3333' as shown in FIG. 3B. Here, the value '3' in the exposure data indicates a degree of power modulation, and the laser power becomes high as the value becomes large. Four numbers arranged for the exposure data on one pixel represent that the pixel is horizontally divided into four parts as shown in FIGS. 2A through 2D. Accordingly, a recording image of the "a certain pixel" corresponding to the pattern matching data shown in FIG. 3A will become a large dot as shown in FIG. 3B.

Next a process for line pattern images will be discussed. Vertical and horizontal lines are recognized as pattern matrices shown in FIGS. 4A and 4B, respectively. Since a vertical line is composed of recording dots continuously extending in the vertical direction, when a recording dot of a vertically long ellipse as shown in FIG. 4C is formed, it is possible to eliminate variation or unstableness of the line width attributed to unevenness of sheet feeding and deflecting irregularity of the scanning line. As to a horizontal line, a recording dot of a horizontally long ellipse as shown in FIG. 4D may dissolve the same problem.

Next, the reason for enabling the aforementioned elimination of unstableness will be described with reference to FIGS. 5A and 5B.

FIG. 5A shows a line recorded by normal circular recording dots while FIG. 5B shows a line recorded by vertically long elliptic recording dots. In these figures, an interval or gap designated by 'g' between second and third scan lines is widened due to the sheet feed unevenness and/or deflecting irregularity of the scan. In FIG. 5A, the line width becomes narrow in the gap 'g' and consequently the line is broken into two pieces. In contrast, in the case shown in FIG. 5B, the unevenness of the auxiliary scanning direction hardly affects the result, and the line is recorded with its width uniform. In the case of the horizontal line, a horizontally long recording dot will work well similarly. Exposure pattern signals for generating vertically and horizontally long dots, are taken to be '1332' and '2232', respectively. The reason why these dots are over-exposed as compared to the dot for recording the neutral pixel is to compensate the recording characteristics that isolated lines tend to become thin in the optical recording apparatus of this kind. In a similar manner as above, slanting lines can be recognized. FIGS. 6A and 6B show a matrix for recognizing a thin slanting line that is inclined at an angle of 45 degrees with the level. As exposure pattern signals corresponding to slanting line image patterns in general tend to be recorded narrower than vertical and horizontal lines. In consideration of this fact, the pattern signal for this example is taken to be '2332' in FIGS. 6A and 6B.

In some host machines, the same slanting line may be recognized as a thickened line as represented by a recognizing pattern matrix shown in FIGS. 7A, 7B, 7C and 7D. In such an example, there is no need to thicken the pattern, so that the pattern signal for each pixel is taken to be '1331' in FIGS. 7A, 7B, 7C and 7D.

Thus, it is also possible to effect independent processing for compensating slanting lines.

Next, a treatment for an unisolated line pattern (i.e., a line with black dots nearby like a pair of lines, for instance) will be described. Vertical and horizontal lines are recognized by detecting pattern matrices shown in FIGS. 8A and 8B, respectively. These patterns in FIGS. 8A and 8B indicate that black dots are present in positions separated by the width of a single pixel from the line to be recorded. Therefore, the line pixels are affected by the black dots nearby, thicken in some extent and recorded on the recording image as shown in FIGS. 8C and 8D. To prevent this, the line belonging to this kind of pattern may and should be exposed to light beams slightly weaker than those used for the examples shown in FIGS. 4A through 4D.

Next, description will be made on a treatment for a pattern having intersecting points. FIG. 9A shows a recognizing pattern matrix for detecting a pattern having an intersection given by vertical and horizontal lines. FIG. 9B shows a recognizing pattern matrix for detecting a pattern having an intersection given by two slanting lines. Since intersecting points tend to become bulky and large, the point is exposed to light with a weakened light pattern, as shown in FIGS. 9C and 9D, than that for the neutral pixel.

Next, description will be made on a treatment for an isolated point pattern. An isolated point shown in FIG. 10A tends to become thin when it is recorded because of the characteristics of the optical recording apparatus of this kind. To compensate this tendency, it is necessary for the isolated point to be exposed to light with a stronger light pattern, as shown in FIGS. 10B, than that for the neutral pixel.

Next, description will be made on a treatment for a halftoned or dotted image. In halftoned images with alternate single dots as shown in FIGS. 11A and 11B, since the black and white parts on the printed image are to be equal in gradation area, the amount of exposure must be delicately controlled. If the amount of exposure is too high, the black part becomes large, whereas the white part becomes large when the amount of exposure is too low. In such cases, it is effective if the exposure for the white part is also modulated. Here, as shown in FIGS. 11C and 11D, black dots in the halftoned image are recorded as with the same exposure for the neutral pixel while the exposure pattern signal for each white dot is set, differently from that for the neutral pixel, to be '1001' so that peripheral part of the pixel may be slightly exposed. Thus, by controlling the exposure pattern in the lateral direction, it is possible that the areas of black and white parts are equal to each other in recording the halftoned image.

As has been described, in the conventional method, various sets of pattern matching data containing exposure data for its center pixel of the pattern are previously stored, and when data on a pixel group is found to correspond to one of the stored pattern matching data, the corresponding stored exposure data is set up for the center pixel of the pixel group in question.

In this conventional method based on the pattern matching technique, exposure data is amended only when each pixel group is found to coincide with one of the pattern matching data prepared in advance. Besides, since pattern matching must be done for all the pixels on the image, the searching operation would take considerable time.

SUMMARY OF THE INVENTION

It is therefore an object of the present invention to provide an exposure controlling method as well as an exposure controlling apparatus wherein numeral calculation with a curve-fitting approximation method is made based on input data as to pixel groups to control the amount of light energy for every pixel, thereby making it easy to control the amount of light energy for various patterns.

A basic principle of the present invention resides in that an exposure controlling method for use in a laser printer whereby the amount of light energy of laser beams irradiated on a photoreceptor is controlled for every pixel to form a latent image, comprises the steps of: depicting a curve by the curve-fitting approximation method based on the positions of peripheral pixels in each black pixel group made up of at least one or more black pixels; and controlling the amount of light energy for every pixel based on the curve.

According to the present invention, in the above exposure controlling method, the control of the amount of light energy for every pixel based on the curve is effected in such a manner that every black pixel is divided into a plurality of sub-pixels and only the sub-pixels existing inside the curve are illuminated by laser beams.

According to the present invention, in the above exposure controlling method, the control of the amount of light energy for every pixel based on the curve is effected in such a manner that every black pixel is divided into a plurality of sub-pixels and the number of sub-pixels to be exposed to laser beams is set up based on a proportion of an area belonging to the inside of the curve in one black pixel to the total area of the pixel in question.

Another principle of the present invention resides in that an exposure controlling apparatus for use in a laser printer whereby the amount of light energy of laser beams irradiated on a photoreceptor is controlled for every pixel to form a latent image, comprises: a representative point setup device for picking up black pixel groups each consisting of at least or more black pixels and determining representative points based on the positions of peripheral pixels in each black pixel group; a curve drawing device for forming a curve for each of the pixel groups by joining the representative points by the curve-fitting approximation method; and structure for determining laser output conditions such as laser illuminating time, laser power and the like for controlling the amount of light energy to be irradiated on each pixel, based on the curve.

In the present invention thus configurated, a curve by the curve-fitting approximation method is depicted for every black pixel group, based on the positions of peripheral pixels of every black pixel group, that is, contour-constituting pixels in each black pixel group. Based on the thus formed curve, the amount of light energy to be illuminated on each pixel in every black pixel group is controlled. Therefore, there is no more necessity for subjecting every pixel group to the pattern matching operation which used to be effected in the conventional configuration.

In the present invention, each pixel is divided into sub-pixels and the sub-pixels belonging to the inside of a curve alone are exposed to laser beams. Therefore, the output image is printed so that part along the curve constitutes the contour of the image to be printed.

In the present invention, each pixel is divided into sub-pixels and the number of sub-pixels to be exposed to laser beams is set up based on a proportion of an area belonging to the inside of the curve in one black pixel to the total area of the pixel. Specifically, the greater the ratio of the area belonging to the inside of the curve is, the more sub-pixels are exposed to laser beams. The smaller the ratio of the area belonging to the inside of the curve is, the less number of sub-pixels are exposed to laser beams. This process makes the edge of the printed image run along the curve.

Further, in the apparatus of the present invention, the representative point setup device determines representative points based on the positions of peripheral pixels in every black pixel group. The curve drawing device depicts a curve joining the representative points. Thereafter, based on the curve, the structure for determining laser output conditions determines the output conditions such as laser illuminating time, laser power and the like for controlling the amount of light energy to be irradiated on each pixel.

BRIEF DESCRIPTION OF THE DRAWINGS

FIGS. 6A and 6B are charts showing recognizing pattern matrices for detecting a thin slanting line section;

FIGS. 7A-7D are charts showing recognizing pattern matrices for detecting a thick slanting line section;

FIG. 8A is a chart showing a recognizing pattern matrix for detecting a vertical line which is unisolated;

FIG. 8B is a chart showing a recognizing pattern matrix for detecting a horizontal line which is unisolated;

FIG. 8C is a chart showing a recorded dot in the vertical line shown in FIG. 8A;

FIG. 8D is a chart showing a recorded dot in the horizontal line shown in FIG. 8B;

FIG. 9A is a chart showing a recognizing pattern matrix for detecting an intersection of a vertical line and horizontal line;

FIG. 9B is a chart showing a recognizing pattern matrix for detecting an intersection of slanting lines;

FIG. 9C is a chart showing a recorded dot in the intersection in FIG. 9A;

FIG. 9D is a chart showing a recorded dot in the intersection in FIG. 9B;

FIG. 10A is a chart showing a recognizing pattern matrix for processing an isolated point pattern;

FIG. 10B is a chart showing a recorded dot of the point pattern in FIG. 10A;

FIG. 11A is a chart showing a recognizing pattern matrix for detecting black part as to processing of a halftoned image;

FIG. 11B is a chart showing a recognizing pattern matrix for detecting white part as to processing of a halftoned image;

FIG. 11C is a chart showing a recorded dot of the black part in FIG. 11A;

FIG. 11D is a chart showing a recorded state of the white part in FIG. 11B;

FIGS. 14A and 14B show a view showing a state in which each pixel in FIG. 12 is divided into smaller pieces;

FIGS. 29A and 29B show an example in accordance with the example 3, and is a view showing sub-pixels to be exposed to pulse-width modulated laser beams (based on the B-spline curve in FIG. 25);

DESCRIPTION OF THE PREFERRED EMBODIMENTS

Embodiments of the present invention will hereinafter be described with reference to the accompanying drawings.

First of all, a procedure of determining the amount of light energy for every pixel will be described in detail with reference to FIG. 12 to FIG. 37.

Figure 1:
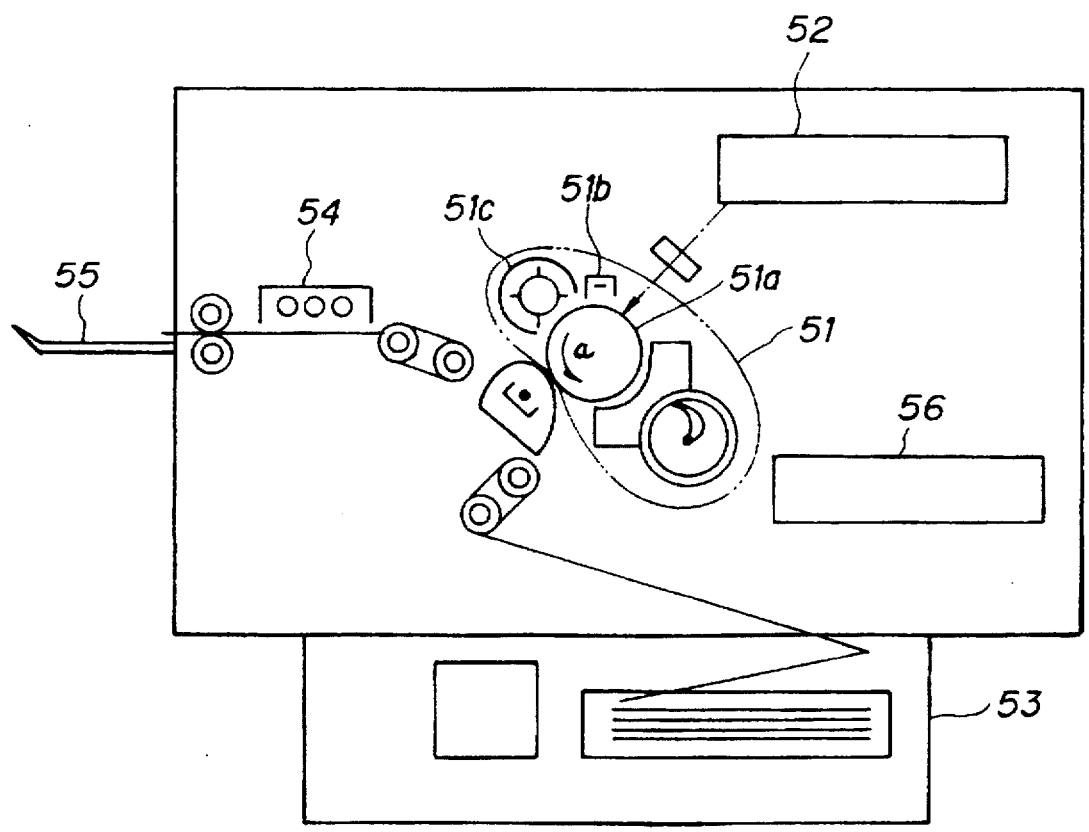
FIG. 1 is a view showing an overall configuration of a typical laser printer.
Figure 2A:
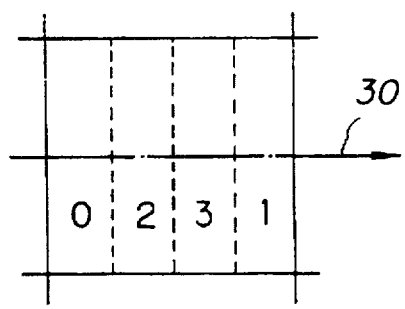
FIG. 2A is a chart showing a recording pixel area in processing recording image data in accordance with a prior art example.
Figure 2B:
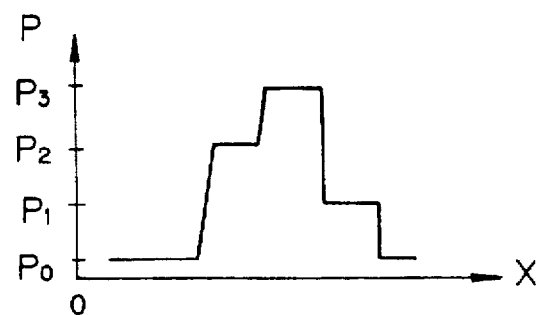
FIG. 2B is a chart showing output from diodes in the process shown in FIG. 2A.
Figure 2C:
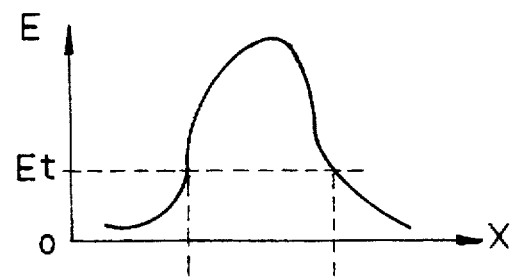
FIG. 2C is a chart showing a distribution of the amount of exposure on a photoreceptor used in the process shown in FIG. 2A.
Figure 2D:
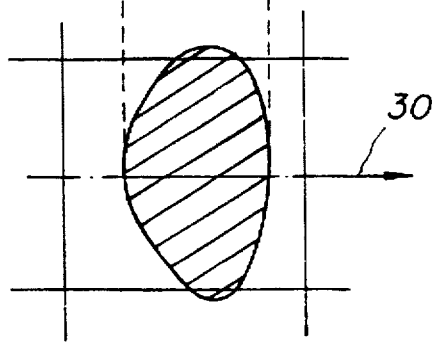
FIG. 2D is a chart showing a recording image prepared by the process shown in FIG. 2A.
Figure 3A:
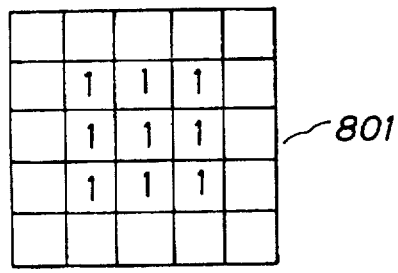
FIG. 3A is a chart for illustrating a treatment of a black solid image pattern.
Figure 3B:
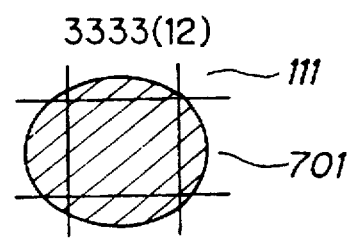
FIG. 3B is a chart showing a recorded result formed by the treatment shown in FIG. 3A.
Figure 4A:
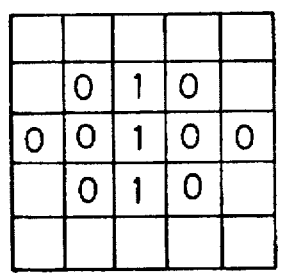
FIG. 4A is a chart showing a recognizing pattern matrix for detecting a vertical line for processing line image patterns.
Figure 4B:
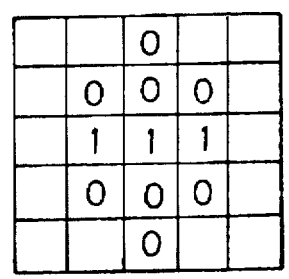
FIG. 4B is a chart showing a recognizing pattern matrix for detecting a horizontal line for processing line image patterns.
Figure 4C:
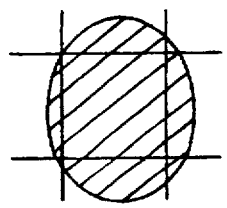
FIG. 4C is a chart showing a recording dot for forming the vertical line shown in FIG. 4A.
Figure 4D:
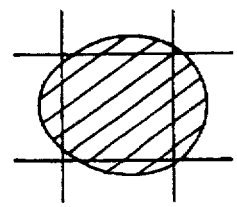
FIG. 4D is a chart showing a recording dot for forming the horizontal line shown in FIG. 4B.
Figures 5A, 5B:
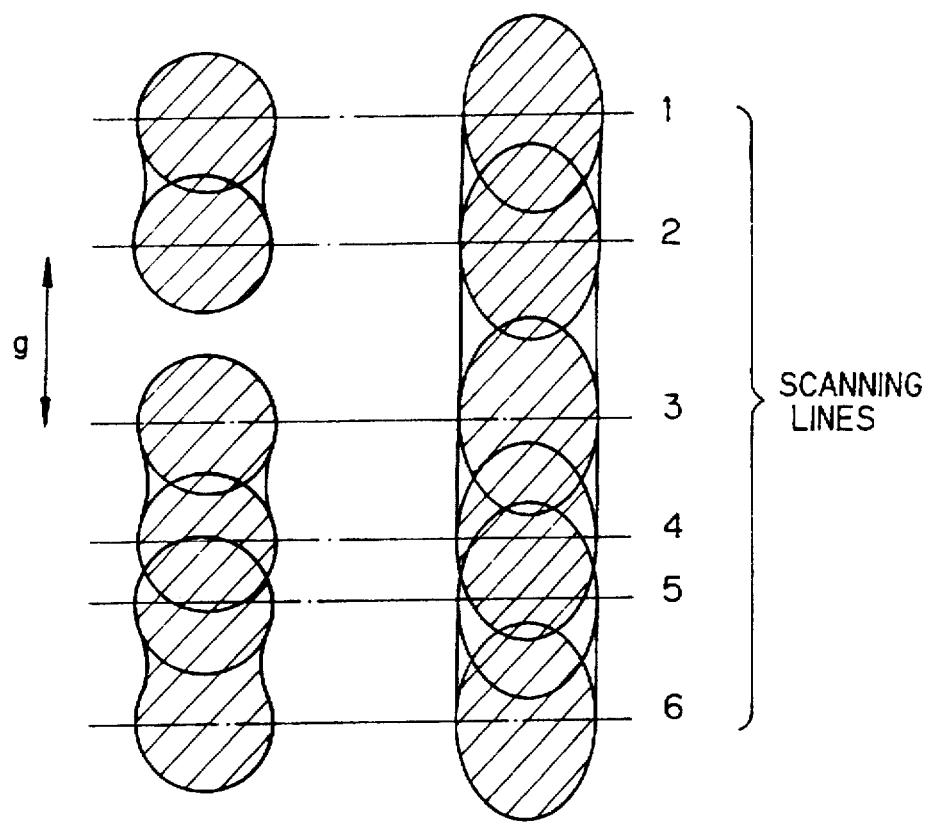
FIG. 5A is a chart showing recording dots recorded with normal circular recording dots.
FIG. 5B is a chart for illustrating a regulated state of a line in its line width, recorded with vertically long ecliptic recording dots.
Figure 12:
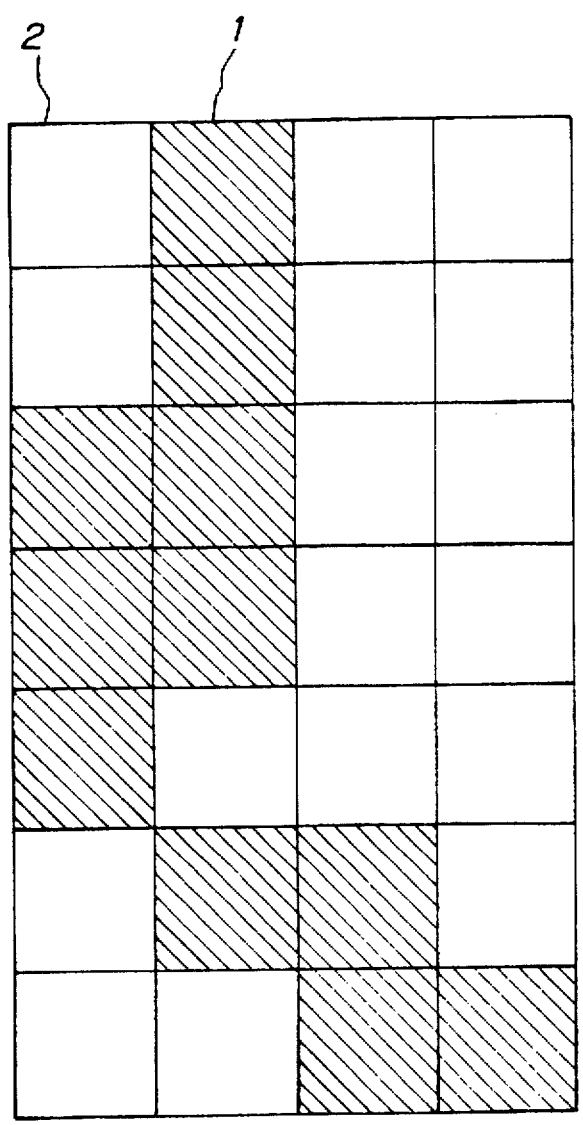
FIG. 12 is a view showing a black pixel group (dot group) for explaining an embodiment of the present invention.
Figure 13:
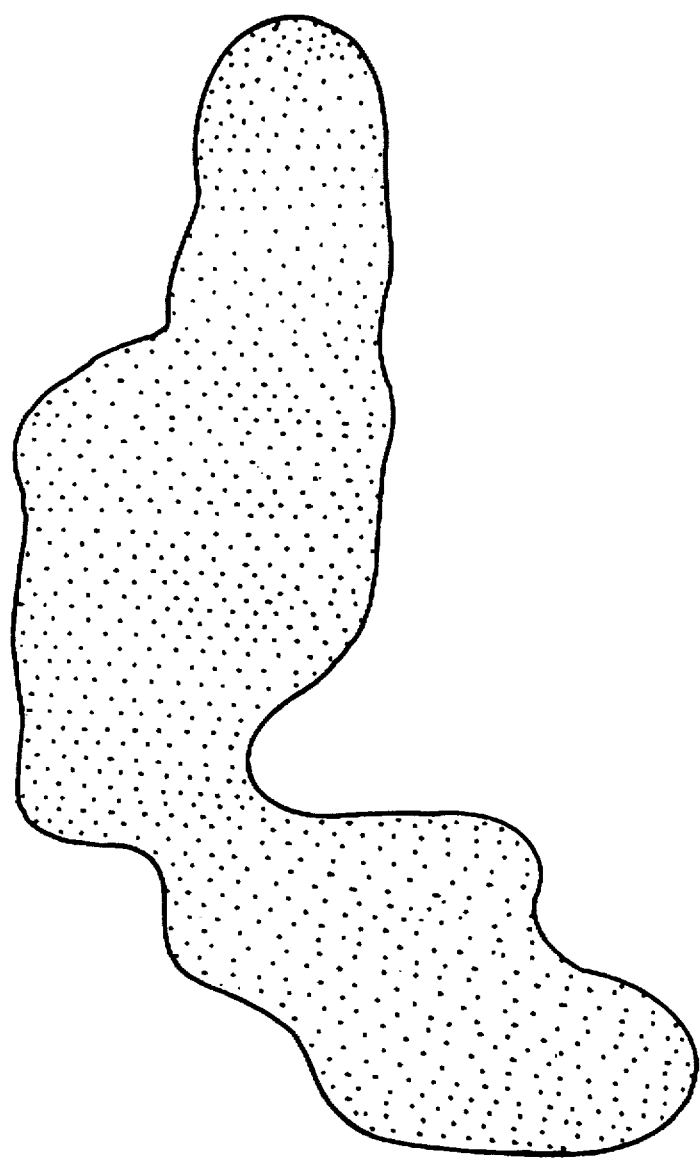
FIG. 13 is a view showing a print output obtained from data on the dot group in FIG. 12.
Figure 15:
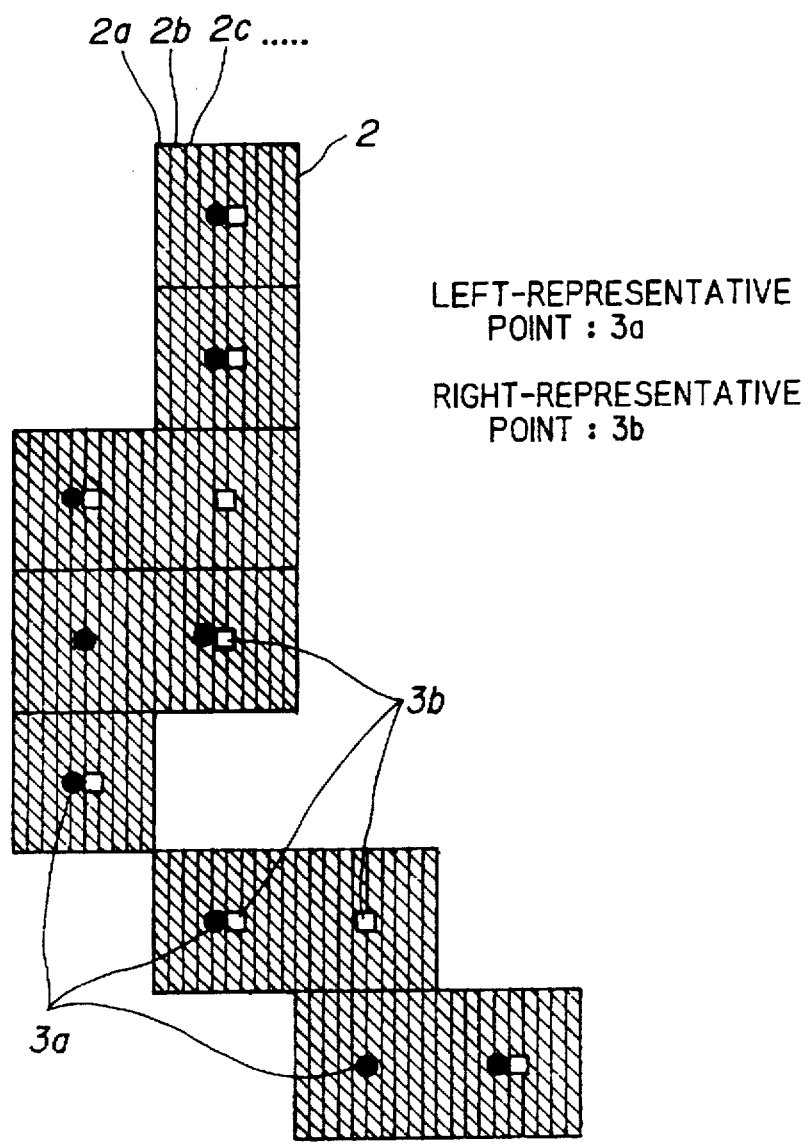
FIG. 15 is a view showing a state in which representative points are added to each pixel in FIG. 14.

Initially, a mass of pixels, or a pixel group 1 is taken out (FIG. 12). The pixel group 1 is composed of plural pixels 2. In the figure, hatched pixels designate black pixels and blank pixels designate white pixels. Hereinafter, the black pixel is called a dot. In this example, the number of pixels for forming the pixel group 1 is chosen conveniently for explaining a treatment for slanting lines, but in the practical treatment, the size of the pixel group 1 may be appropriately set up, usually by a single character range as a unit when the system handles characters. In the figure, the lateral direction represents the main scan direction at the time of laser beam exposure. Here, if the data on the pixel group 1 is used as it is to reproduce a printout image, jaggedness disadvantageously appears in the form of a serrate edge as shown in FIG. 13. The jaggedness will be alleviated by controlling the amount of light energy for every pixel in the following manner.

As a first step, each dot is horizontally divided into elongate parts (FIGS. 14A and 14B). The number of the division should be equal to the number of variable steps in pulse-width modulation of a semiconductor laser used. As an example, when the pulse width of a semiconductor laser used can be adjusted to ten different duration, each dot is divided into ten parts. As the number of the division increases, jaggedness can be better alleviated. Hereinafter, the thus divided parts are called sub-pixels 2a, 2b . . . . For the part of black sub-pixels (to be also referred to as sub-dots) in one pixel, the semiconductor laser is turned on so that the sub-pixels may be exposed to laser beams. In this embodiment, one pixel is handled as 100×100 micro-pixels in the internal processing. Therefore, each of the aforementioned sub-pixels is represented by 10×100 micro-pixels. In the following description, a position inside a pixel is represented by a micro-pixel coordinate, i.e., (a vertical micro-pixel position, a horizontal micro-pixel position). For instance, the top left of the pixel is represented by (0,0) whereas the bottom right of the pixel is represented by (99,99).

For every dot 2, a left-representative point 3a and a right-representative point 3b are added to the dot at the center point (49, 49) thereof in the following rules (see FIG. 15):

Left-representative point 3a is added if any one of the left and below neighboring pixels is blank.

Right-representative point 3b is added if any one of the right and above neighboring pixels is blank.

Figure 16:
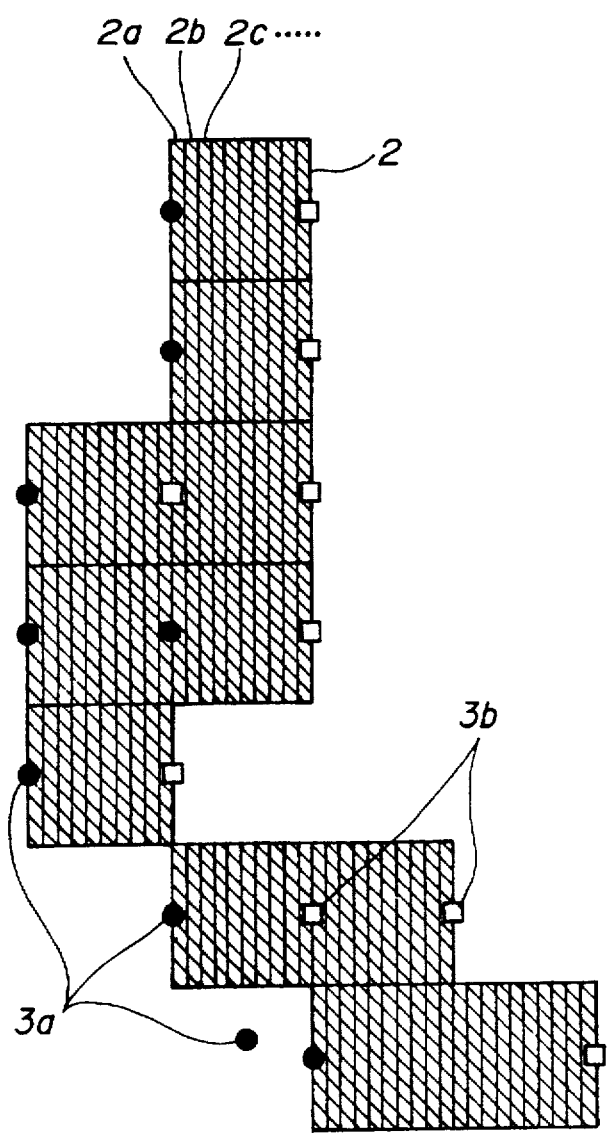
FIG. 16 is a view showing a state in which representative points for each pixel in FIG. 15 are shifted to respective positions for drawing a curve.

Further, for every dot, the left-representative point 3a is shifted to the leftmost position (0, 49) inside the dot in question and the right-representative point 3b is shifted to the rightmost position (99, 49) inside the dot (see FIG. 16). By this procedure, the left- and right-representative points 3a, 3b become points displaying the contour of the dot group.

Figure 17:
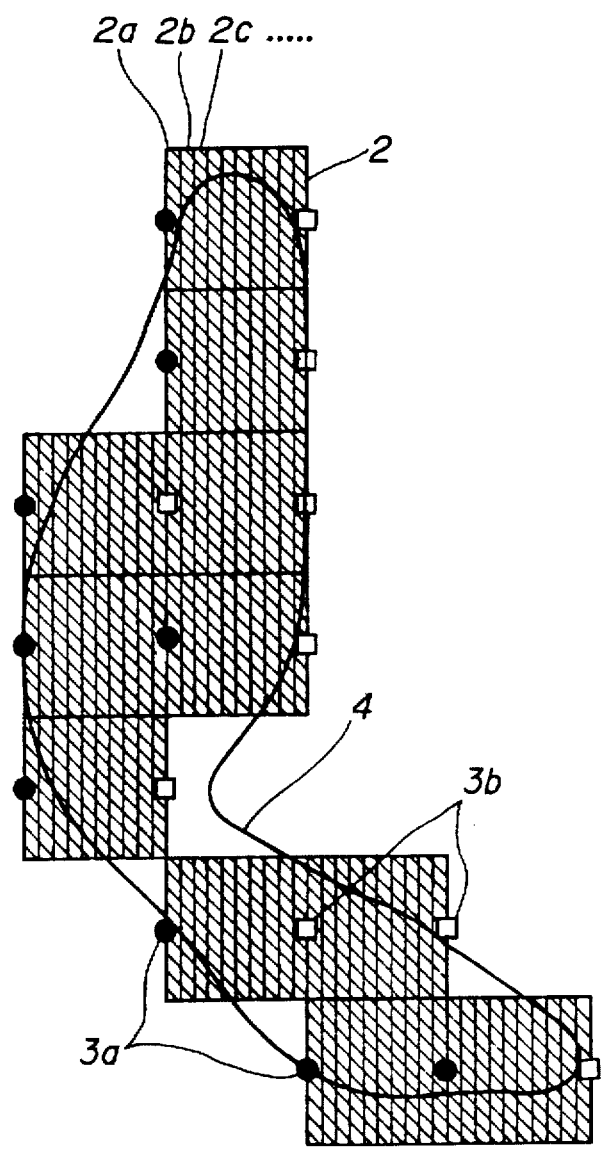
FIG. 17 is a view showing a state in which a B-spline curve is depicted based on FIG. 16.
Figure 18:
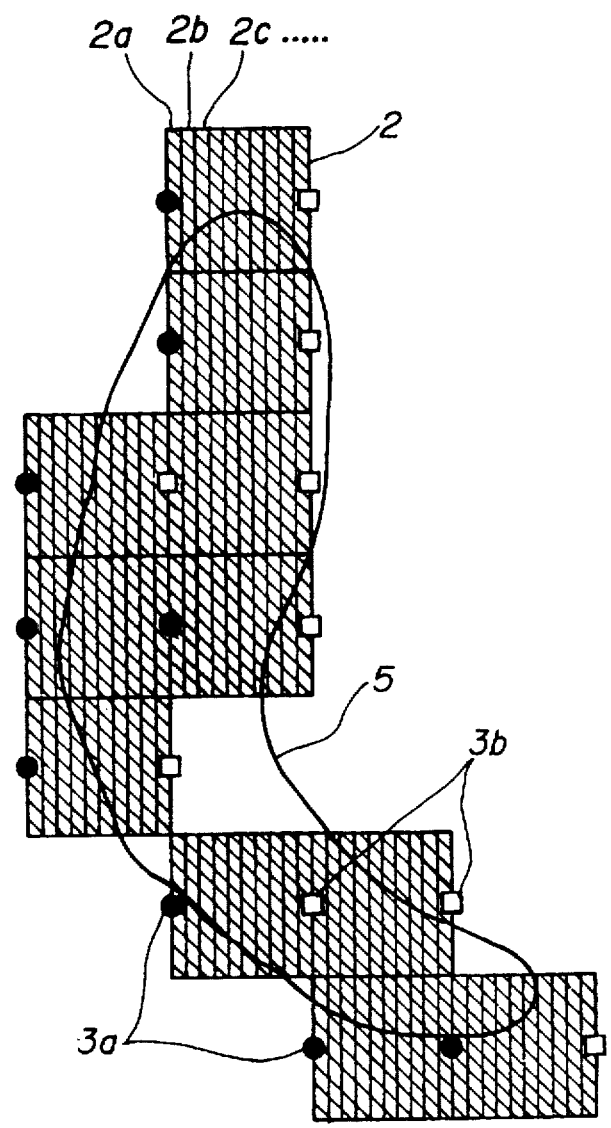
FIG. 18 is a view showing a state in which a Bejie curve is depicted based on FIG. 16.

Next, a curve smoothly joining all the left- and right-representative points 3a, 3b is drawn using a curve-fitting approximation method (see FIGS. 17 and 18). As for the curve-fitting approximation method, publicly known two-dimensional B-spline curve-fitting approximation and Bejie curve-fitting approximation can be used. Now, these approximation methods will be briefly described.

First, consider the two-dimensional B-spline curve-fitting approximation. This method is favorable for the present invention because a curve drawn by the two-dimensional B-spline curve-fitting approximation passes points close to representative points and therefore the resulting pattern will be little deformed from the original shape. In addition, this approximation can be done with fewer calculations. A B-spline curve can be formed based on the following algorithm:

1) Give at least three points to be approximated. The number of the given points is taken to be 'n' and each given point is to be represented by a coordinate $(X_i, Y_i)$ (i varies from 1 to n). In order to allow reference to a point (i−1) when i=1 (i.e., an imaginary point (i=0)), the point is assumed to be represented by a coordinate $(X_1, Y_1)$. To allow reference to a point (i+1) when i=n (i.e., an imaginary point (i=n+1)), the point is assumed to be represented by a coordinate of the nth point $(X_n, Y_n)$.

2) To approximate an interval between i and i+1, the following formulae will be used:

$$x = X_{i-1}B_{i-1}(T) + X_i B_i(T) + X_{i+1}B_{i+1}(T)$$

$$y = Y_{i-1}B_{i-1}(T) + Y_i B_i(T) + Y_{i+1}B_{i+1}(T)$$

where x and y represent approximated points.

3) Values for B's can be calculated as follows:

$$B_1(T) = (1-T)^2/2$$

$$B_2(T) = (1-T)T + \frac{1}{2}$$

$$B_3(T) = T^2/2$$

4) B-Values are determined by varying the variable T from 0 to 1 at intervals of a constant width. For example, if the constant width is taken to be 0.2, the variable T takes values of 0.2, 0.4, 0.6, 0.8 and 1.0. With the width of 0.2, B-values are calculated as follows:

TABLE 1

| No. | T | $B_1$ | $B_2$ | $B_3$ |
|---|---|---|---|---|
| 1 | 0 | 0.50 | 0.50 | 0 |
| 2 | 0.2 | 0.32 | 0.66 | 0.02 |
| 3 | 0.4 | 0.18 | 0.74 | 0.08 |
| 4 | 0.6 | 0.08 | 0.74 | 0.18 |
| 5 | 0.8 | 0.02 | 0.66 | 0.32 |
| 6 | 1.0 | 0 | 0.50 | 0.50 |

5) Using B-values determined in 4), x and y are determined from $(X_i, Y_i)$ to $(X_{i+1}, Y_{i+1})$. For example, for T=0.2, six points can be determined.

6) Increasing i one by one and determining x and y for each i, this operation is repeated until i=n. In this calculation, B is independent of i-values, so that B-values calculated once can be used repeatedly.

FIG. 17 shows a B-spline curve (designated at 4) depicted in accordance with the above algorithm.

In contrast, since a Bejie curve, in general, deviates largely from given points, it is difficult for the resulting pattern to keep the original shape. Nevertheless, the Bejie curve approximation is excellent in depicting a more natural curve than the B-spline curve approximation. A Bejie curve can be drawn based on the following algorithm:

1) Give at least four points to be approximated. The number of the given points is taken to be 'n' and each given point is to be represented by a coordinate $(X_i, Y_i)$ (i varies from 1 to n). In order to allow reference to a point (i−1) when i=1 (i.e., an imaginary point (i=0)), the point is assumed to be represented by a coordinate $(X_1, Y_1)$. To allow reference to points (i+1) and (i+2), when i=n (i.e., imaginary points (i=n+1 and i=n+2)), both the points are assumed to be represented by a coordinate of the nth point $(X_n, Y_n)$.

2) To approximate an interval between i and i+1, the following formulae will be used:

$$x = X_{i-1}B_{i-1}(T) + X_i B_i(T) + X_{i+1}B_{i+1}(T) + X_{i+2}B_{i+2}(T)$$

$$y = Y_{i-1}B_{i-1}(T) + Y_i B_i(T) + Y_{i+1}B_{i+1}(T) + Y_{i+2}B_{i+2}(T)$$

where x and y represent approximated points.

3) Values for B's can be calculated as follows:

$$B_1(T) = (1-T)^3$$

$$B_2(T) = 3T(1-T)^2$$

$$B_3(T) = 3T^2(1-T)$$

$$B_4(T) = T^3$$

4) B-Values are determined by varying the variable T from 0 to 1 at intervals of a constant width. For example, if the constant width is taken to be 0.2, the variable T takes values of 0.2, 0.4, 0.6, 0.8 and 1.0. With the width of 0.2, B-values are calculated as follows:

TABLE 2

| No. | T | $B_1$ | $B_2$ | $B_3$ | $B_4$ |
|---|---|---|---|---|---|
| 1 | 0 | 1.00 | 0 | 0 | 0 |
| 2 | 0.2 | 0.51 | 0.38 | 0.10 | 0.01 |
| 3 | 0.4 | 0.22 | 0.43 | 0.29 | 0.06 |
| 4 | 0.6 | 0.06 | 0.29 | 0.43 | 0.22 |
| 5 | 0.8 | 0.01 | 0.10 | 0.38 | 0.51 |
| 6 | 1.0 | 0 | 0 | 0 | 1.00 |

5) Using B-values determined in 4), x and y are determined from $(X_i, Y_i)$ to $(X_{i+1}, Y_{i+1})$. For example, for T=0.2, six points can be determined.

6) Increasing i one by one and determining x and y for each i, this operation is repeated until i=n. In this calculation, B is independent of i-values, so that B-values calculated once can be used repeatedly.

FIG. 18 shows a Bejie curve (designated at 5) depicted in accordance with the above algorithm.

After drawing the curve 4 or 5 in the way described above, the condition of the laser output from the semiconductor laser is determined for every pixel, so that each pixel may receive a proper amount of light energy. The output of the semiconductor laser can be conditioned by its pulse at the pulse-width modulation mode or by its power at the power modulation mode. It is also possible to control the output by the combination of the pulse-width modulation and the power modulation. This combined controlling method using both the pulse-width modulation and the power modulation will be described later. In the case where the laser output is controlled by only the pulse-width modulation, pulse widths are determined on the basis of the above curve 4 or 5 using any one of the following two schemes:

(1) Pulse widths of laser are so set up as to irradiate the sub-pixels present inside the curve 4 or 5 (Example 2)

(2) Pulse widths of laser are so set up that laser beams irradiate each pixel in accordance with a proportion of area enclosed by the curve within the black pixel to the whole area of the pixel (Example 3).

First, the method (1) will be discussed. Drawings used for explaining the following procedure represent two kinds of examples, one for the B-spline curve and the other for the Bejie curve.

Figure 19:
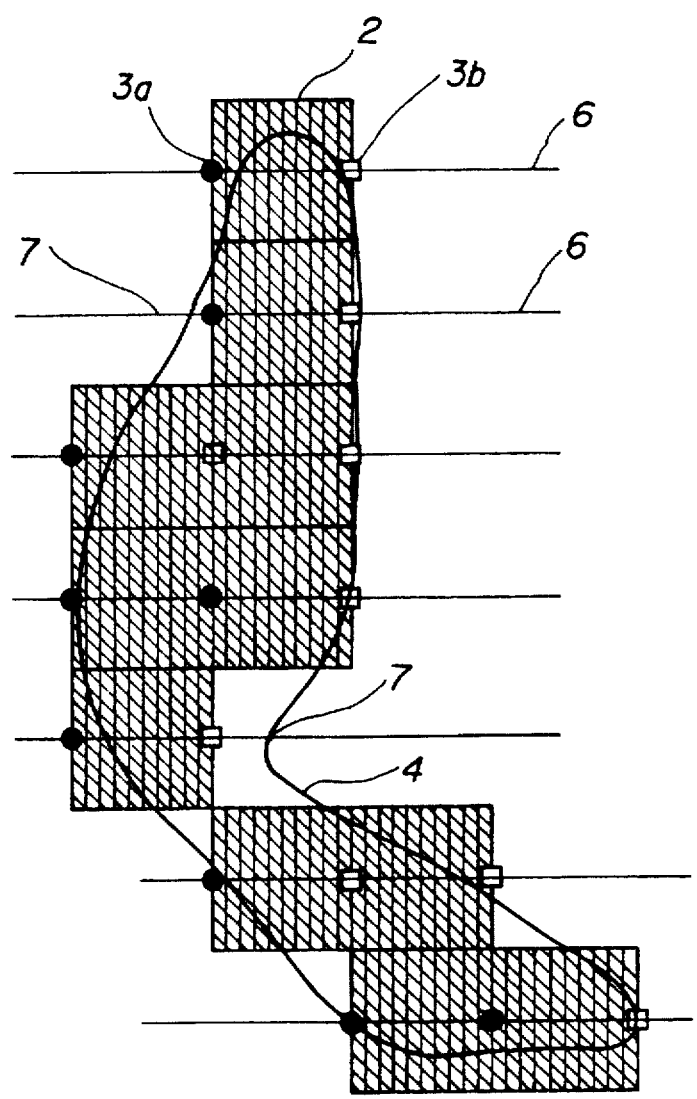
FIG. 19 shows an example in accordance with an example 2, and is a view showing a state in which a B-spline curve is depicted with laser beam scanning lines.
Figure 20:
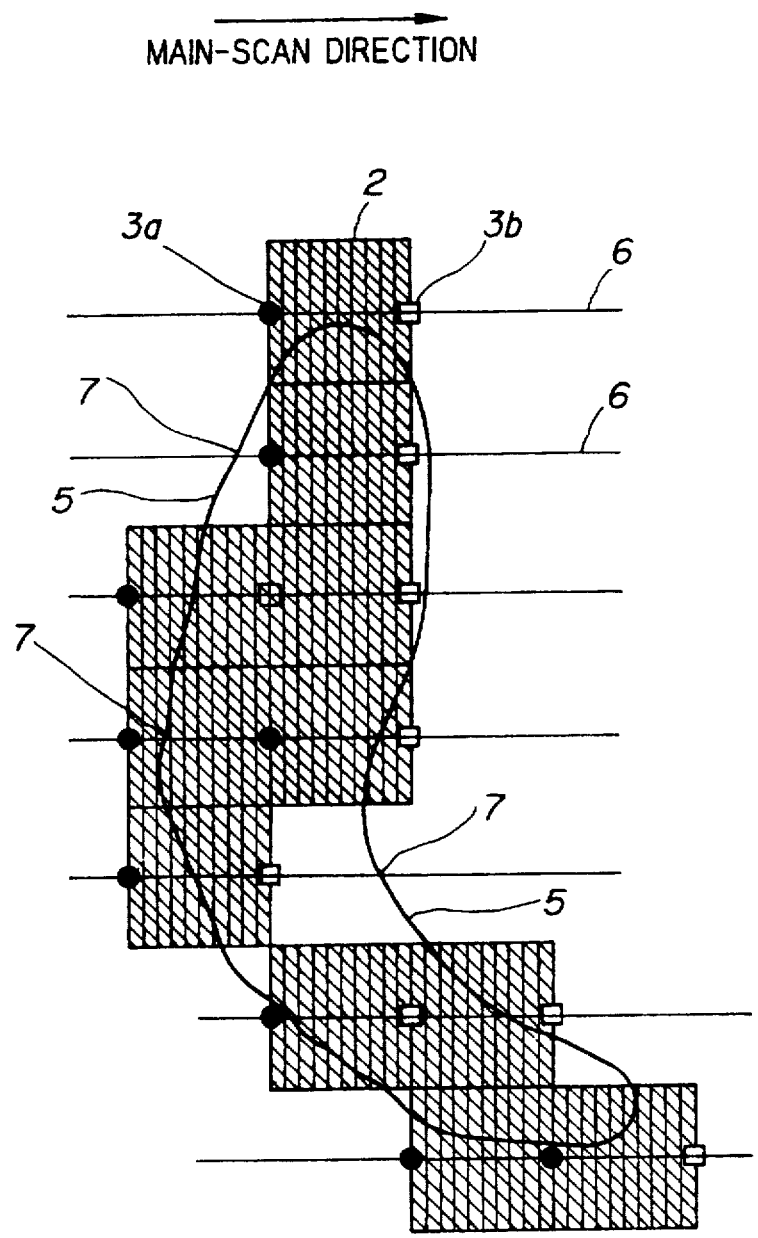
FIG. 20 shows an example in accordance with the example 2, and is a view showing a state in which a Bejie curve is depicted with laser beam scanning lines.
Figure 21:
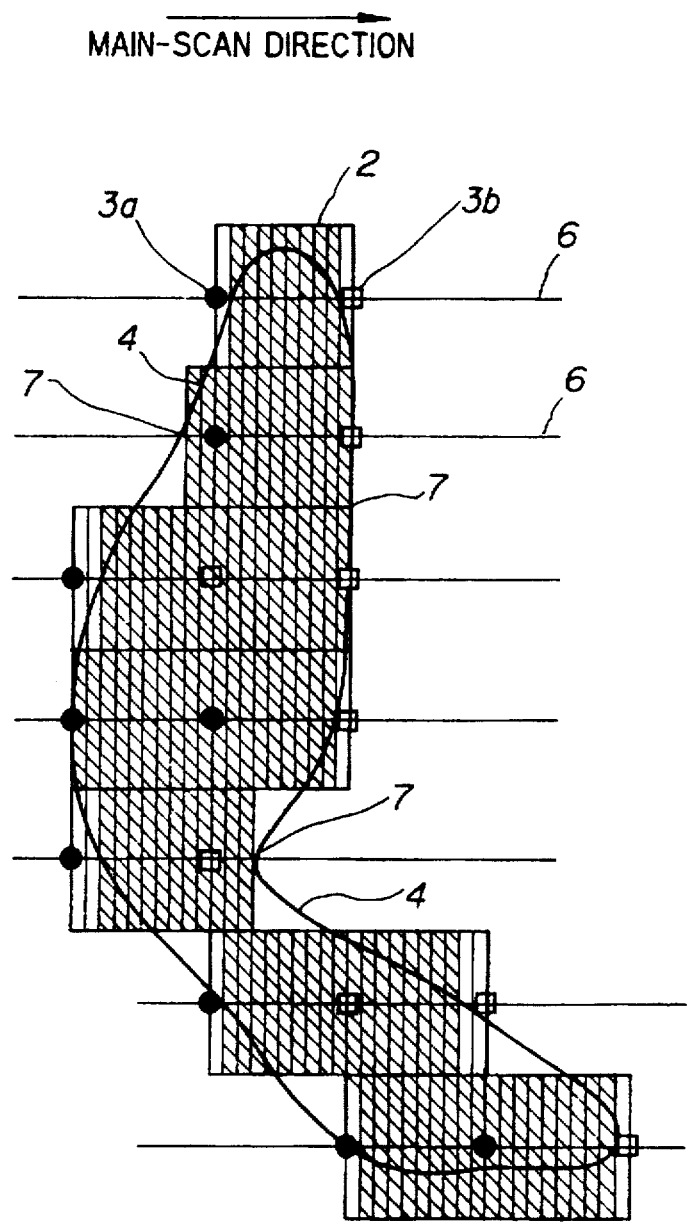
FIG. 21 shows an example in accordance with the example 2, and is a view showing a state in which sub-dots are added or deleted based on the B-spline curve shown in FIG. 19.
Figure 22:
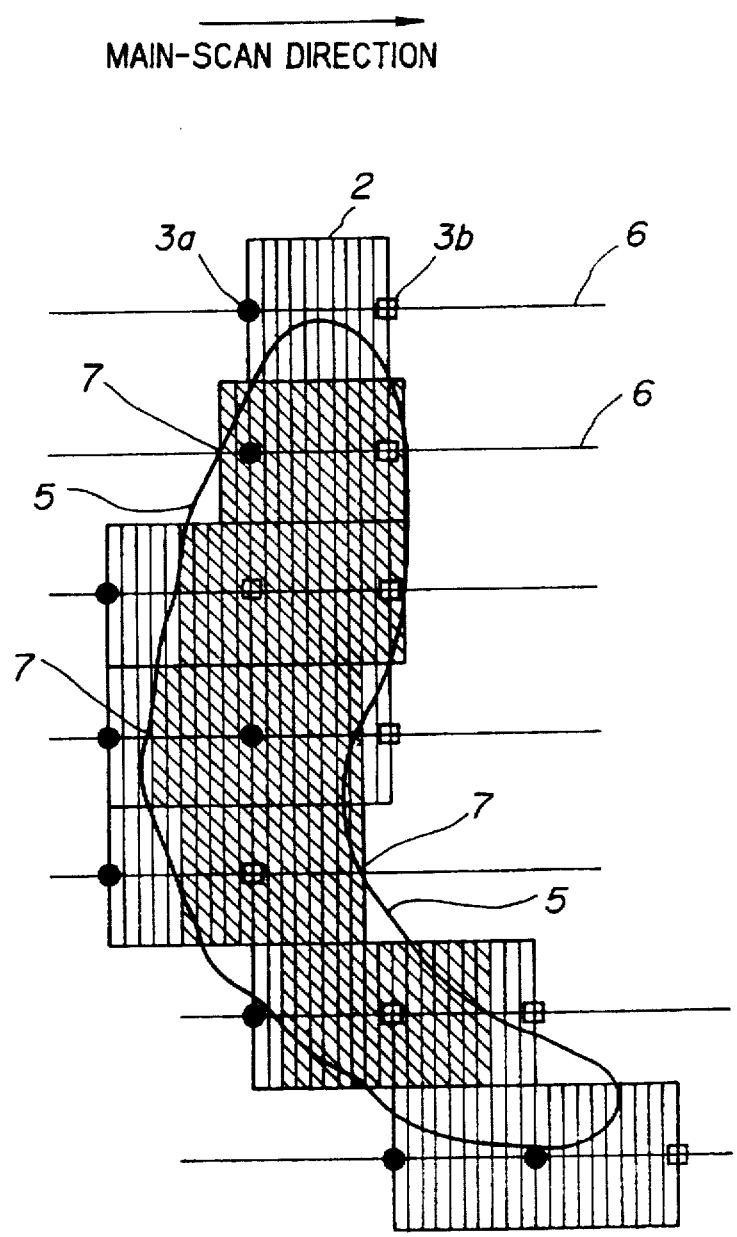
FIG. 22 shows an example in accordance with the example 2, and is a view showing a state in which sub-dots are added or deleted based on the Bejie curve shown in FIG. 20.

In FIGS. 19 and 20, horizontal lines designated at 6 passing through vertically middle levels of dots 2 represent main scanning lines of laser beams. Attention must be paid to intersecting points 7 between the scanning lines 6 and the curve 4 or 5. Then, sub-dots are added or deleted from each section positioned between an intersecting point 7 and a left- or right-representative point 3a or 3b (see FIGS. 21 and 22).

As to a left-representative point 3a:

If an intersecting point 7 is present on the left side of the representative point 3a, sub-dots are added to the sub-pixels (2a, 2b . . . ) between the two points.

If an intersecting point 7 is present on the right side of the representative point 3a, sub-dots are deleted from the sub-pixels (2a, 2b . . . ) between the two points.

As to a right-representative point 3b:

If an intersecting point 7 is present on the right side of the representative point 3b, sub-dots are added to the sub-pixels (2a, 2b . . . ) between the two points.

If an intersecting point 7 is present on the left side of the representative point 3b, sub-dots are deleted from the sub-pixels (2a, 2b . . . ) between the two points.

Figure 23:
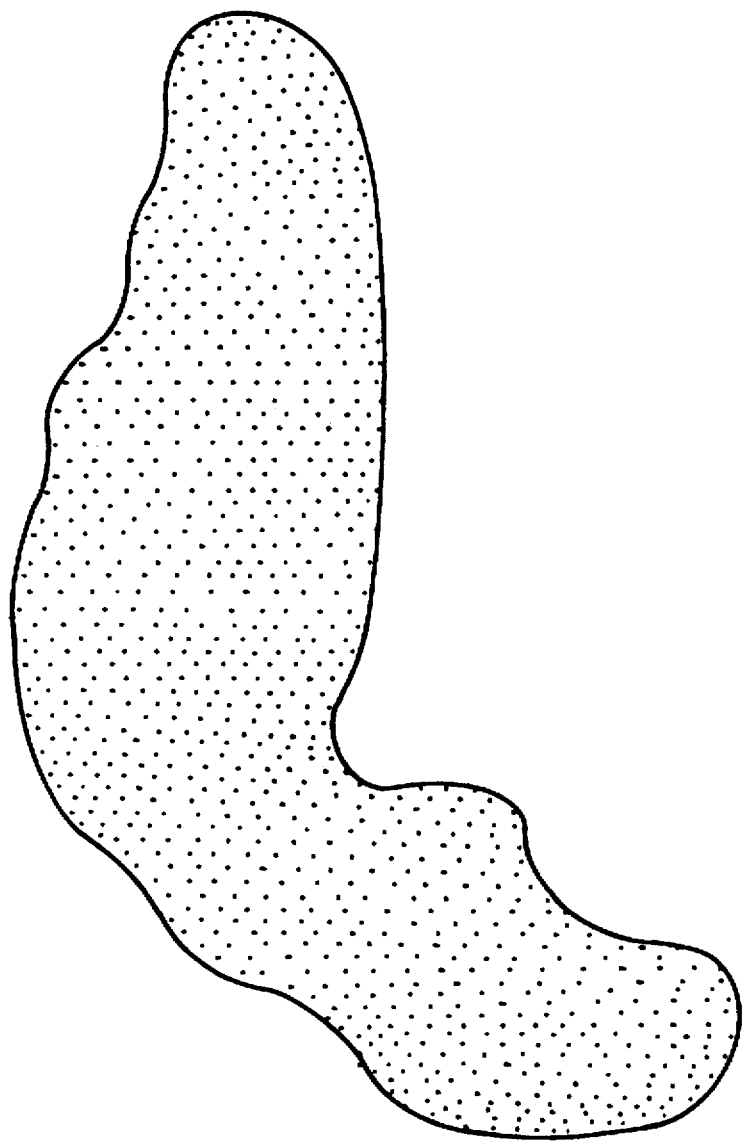
FIG. 23 shows an example in accordance with the example 2, and is a view showing a printed result obtained from processed data based on the B-spline curve in FIG. 19.
Figure 24:
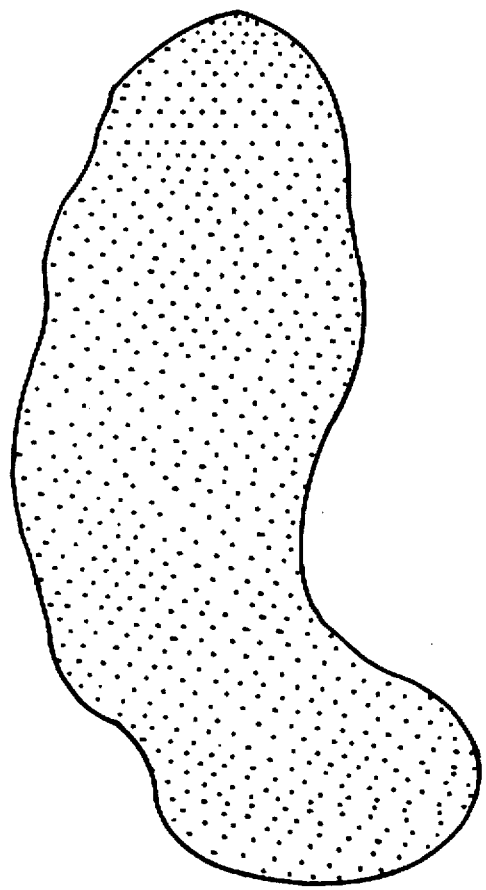
FIG. 24 shows an example in accordance with the example 2, and is a view showing a printed result obtained from processed data based on the Bejie curve in FIG. 20.

Thus, sub-dots are added or deleted so as to determine sub-dots to be irradiated by the semiconductor laser. At the time of laser exposure, pulse-exposure is effected in conformity with the number of the sub-dots. That is, the semiconductor laser is turned on for the part of the sub-dots in every pixel to irradiate the photoreceptor. Image outputs printed based on this scheme are shown in FIGS. 23 and 24.

Next, the method (2) will be described.

Figure 25:
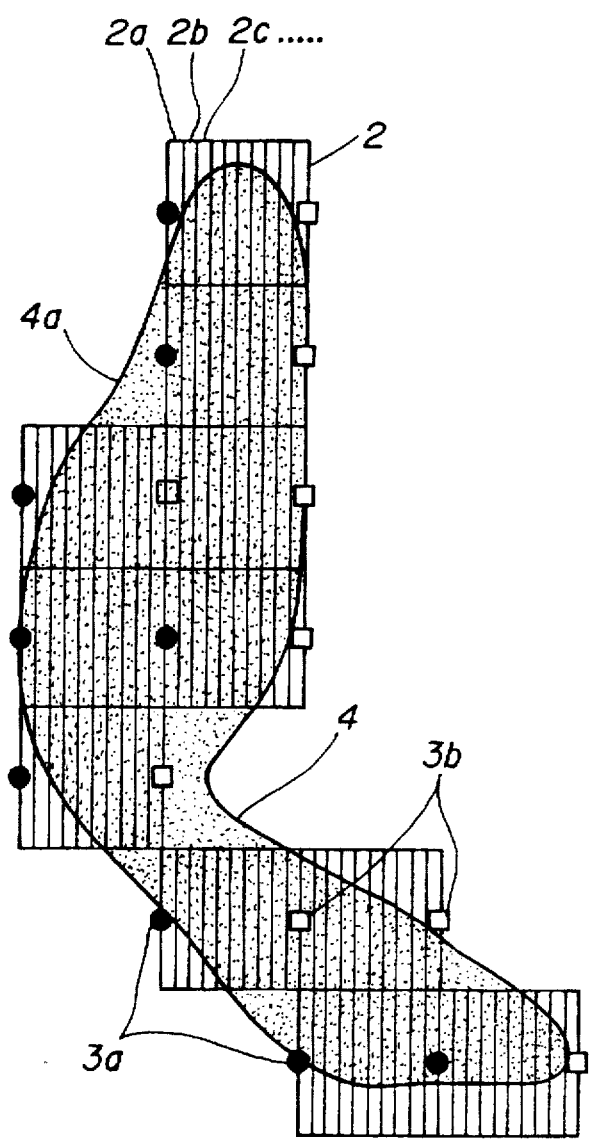
FIG. 25 shows an example in accordance with a example 3, and is a view showing a state in which area inside a curve (B-spline curve) is fully painted out or recognized.
Figure 26:
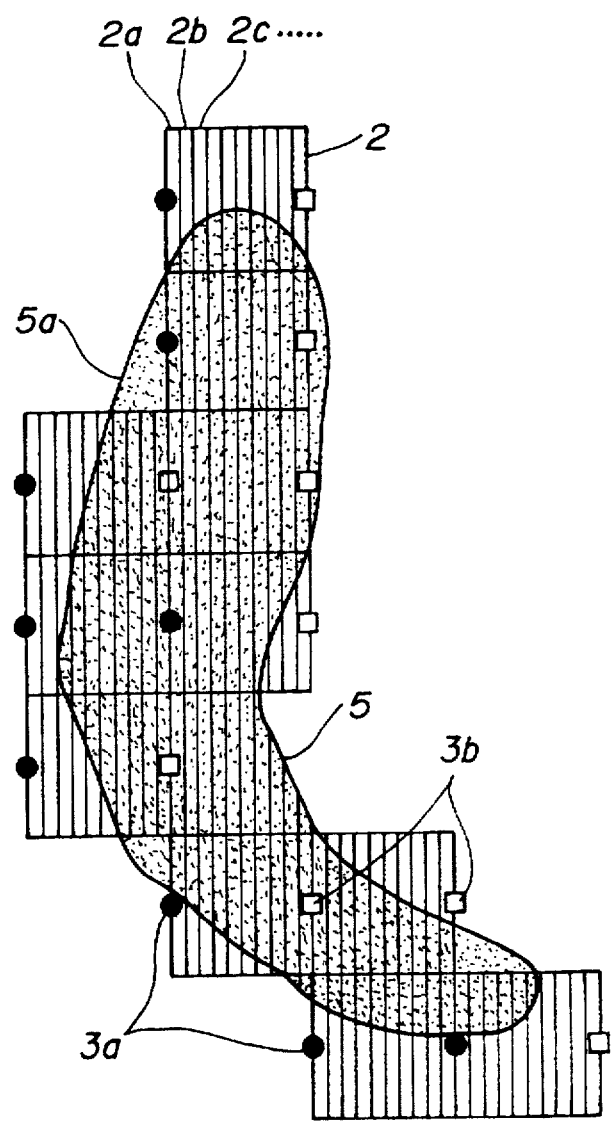
FIG. 26 shows an example in accordance with the example 3, and is a view showing a state in which area inside a curve (Bejie curve) is fully painted out or recognized.
Figures 27A, 27B:
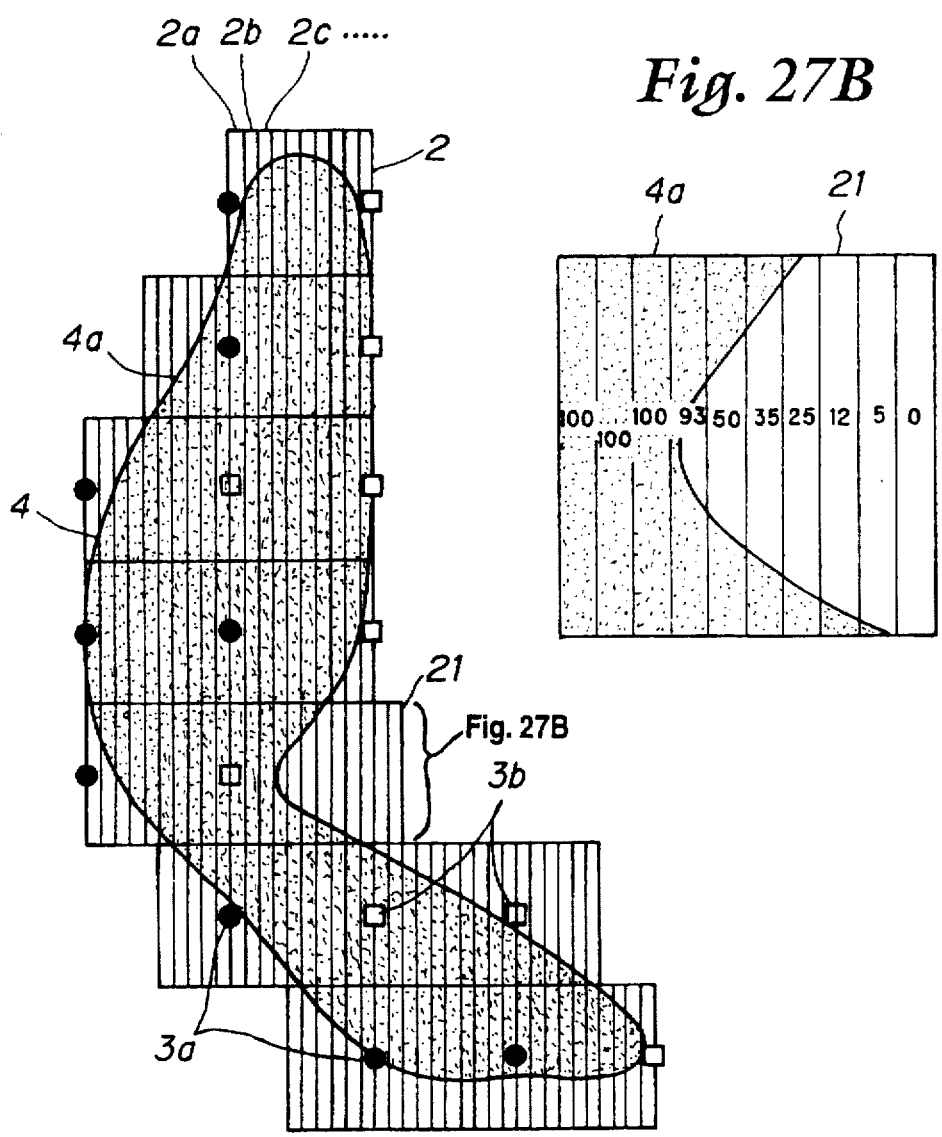
FIGS. 27A and 27B show an example in accordance with the example 3, and is a view showing proportions of curve-enclosed area in every sub-pixel to the total area of a sub-pixel (based on the B-spline curve in FIG. 25)
Figure 28A:
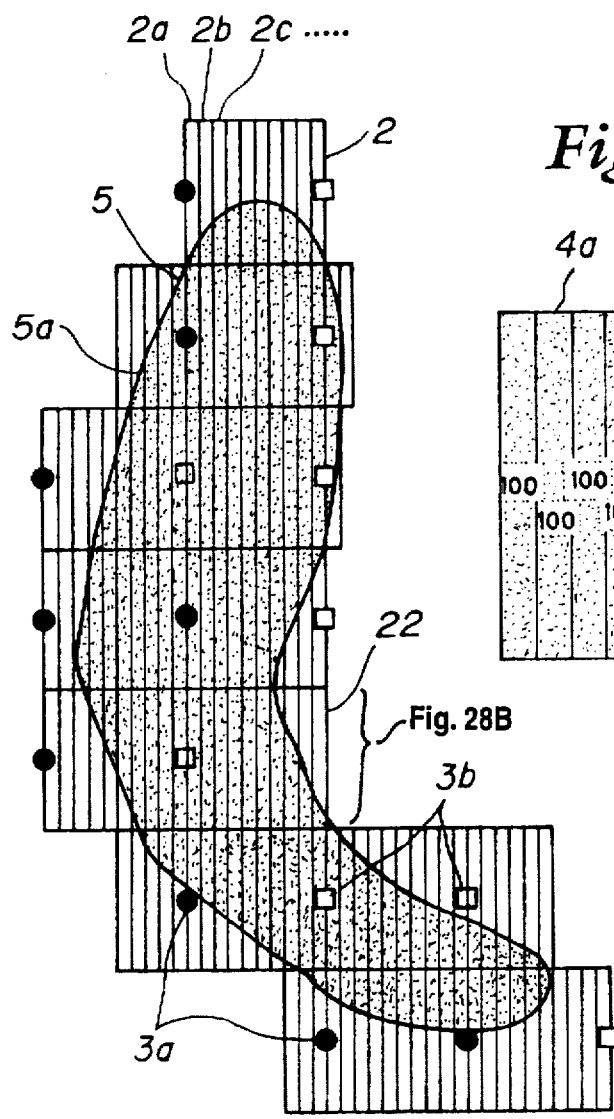
FIGS. 28A and 28B show an example in accordance with the example 3, and is a view showing proportions of curve-enclosed area in every sub-pixel to the total area of a sub-pixel (based on the Bejie curve in FIG. 26)
Figure 28B:
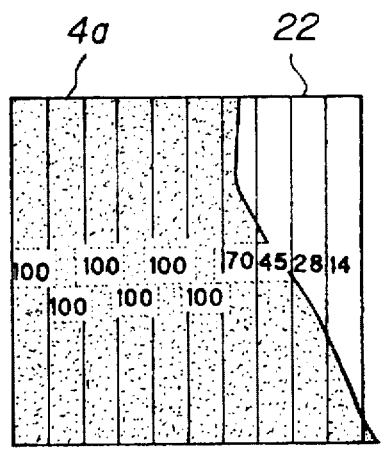
Figure 30A:
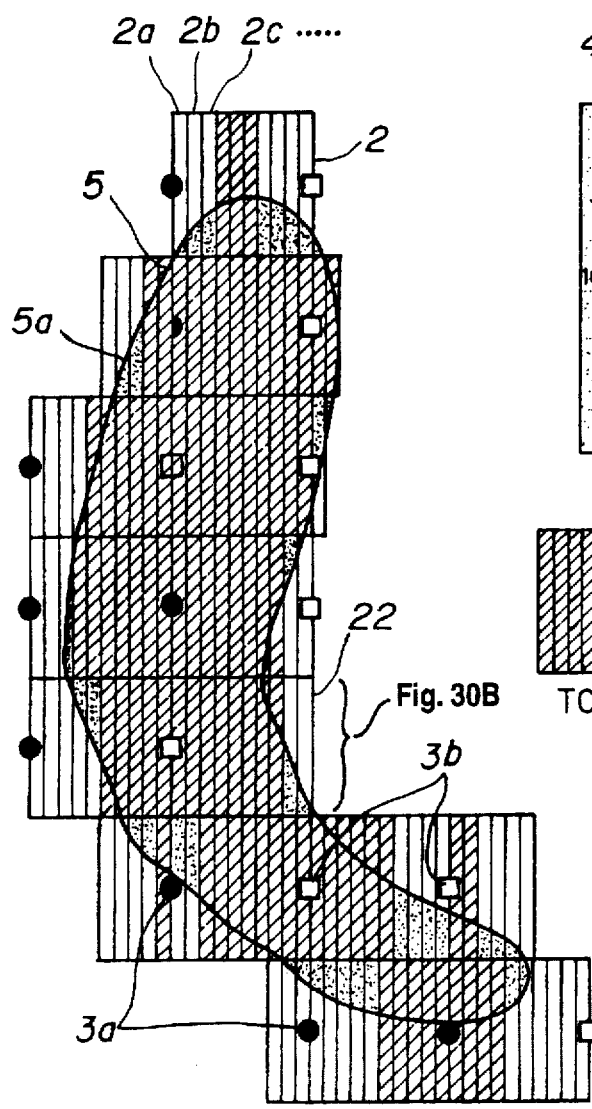
FIGS. 30A and 30B show an example in accordance with the example 3, and is a view showing sub-pixels to be exposed to pulse-width modulated laser beams (based on the Bejie curve in FIG. 26)
Figure 30B:
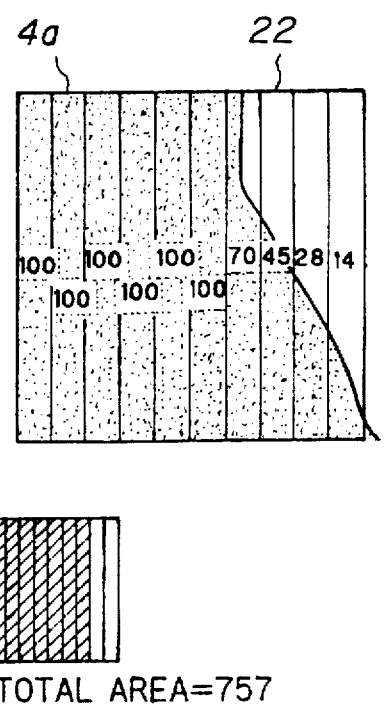

First, the region enclosed by the curve 4 or 5 is fully painted or blackened (see FIGS. 25 and 26). The region enclosed by the curve 4 or 5 is called as a curve-enclosed area and is designated at 4a or 5a. If any part inside the curve-enclosed area 4a or 5a does not belong to the original area of dots or black pixels, sub-pixels (2a, 2b . . . ) are added to the part (FIGS. 27 and 28). Thereafter, calculated for each sub-pixel (2a, 2b . . . ) is an area proportion of the part inside the curve-enclosed area 4a or 5a within the sub-pixel to the whole part of the sub-pixel. This can be determined by the following formula:

[Curve-enclosed area proportion in a sub-pixel (%)]=[the number of micro-pixels inside the curve-enclosed area 4a or 5a within the sub-pixel]÷[the number of micro-pixels inside the sub-pixel]×100

As examples, FIGS. 27A, 27B, 28A and 28B show, for pixels 21 and 22, calculated curve-enclosed area proportions in sub-pixels in the pixel 21 or 22.

Then, curve-enclosed area proportions for all the sub-pixels in each pixel are added up for every pixel. Based on the thus determined curve-enclosed area, pulse widths are determined. That is, the number of sub-pixels and their positions to be exposed to the laser beam are determined (see FIGS. 29A, 29B, 30A and 30B). This can be done as follows.

For a pixel having a left-representative point 3a alone or for a pixel which is added to the pixel having a left-representative point, sub-dots (black sub-pixels) are formed from the rightmost sub-pixel in the pixel in question by the number of ([the totalized curve-enclosed area]÷10).

For a pixel having a right-representative point 3b alone or for a pixel which is added to the pixel having a right-representative point, sub-dots are formed from the leftmost sub-pixel in the pixel in question by the number of ([the totalized curve-enclosed area]÷10).

For a pixel having both right and left-representative points 3a and 3b alone: in this case, the pixel is divided in two by a middle vertical line. Then, sub-dots are formed from the central line leftward by the number of ([the totalized curve-enclosed area on the left side of the middle line]÷10). Similarly, sub-dots are formed from the central line rightward by the number of ([the totalized curve-enclosed area on the right side of the middle line]÷10).

As briefly stating this treatment, this method is to determine how many sub-pixels are turned on or exposed to the laser illumination, based on the proportion (the number of micro-pixels) of the curve-enclosed area 4a, 5a occupying in a pixel. Accordingly, it is possible to directly determine the curve-enclosed area (proportion) in a pixel, in place of determining the curve-enclosed area (proportion) for every sub-pixel in a pixel and totaling the determined curve-enclosed areas for all the sub-pixels in the pixel.

Now, a specific example for determining pulse widths will be shown. In FIGS. 29A and 29B, a pixel 21 is one which is added on the right side of a pixel having a right-representative point. From the figure, a totalized curve-enclosed area is known to be 520, the proportion of the area to the total pixel area is 520÷10=52 (%). Hereinafter, this value (52%) will be referred to as a valid area. In the pixel 21, sub-pixels equivalent to the valid area (52%) from the leftmost are to be allotted as black sub-pixels. From this, the pulse width for turning on the semiconductor laser is determined. This can be done in the following formula:

[Pulse width]=[Valid area]/[Unit-pulse width]

where the unit-pulse width is defined as

[Unit-pulse width]=100/[Number of pulse width modulating steps].

The decimal part of the calculated pulse width is rounded off. With this treatment, the semiconductor laser is turned on for five pulses from the leftmost sub-pixel in the pixel 21 shown in FIGS. 29A and 29B.

Figure 31:
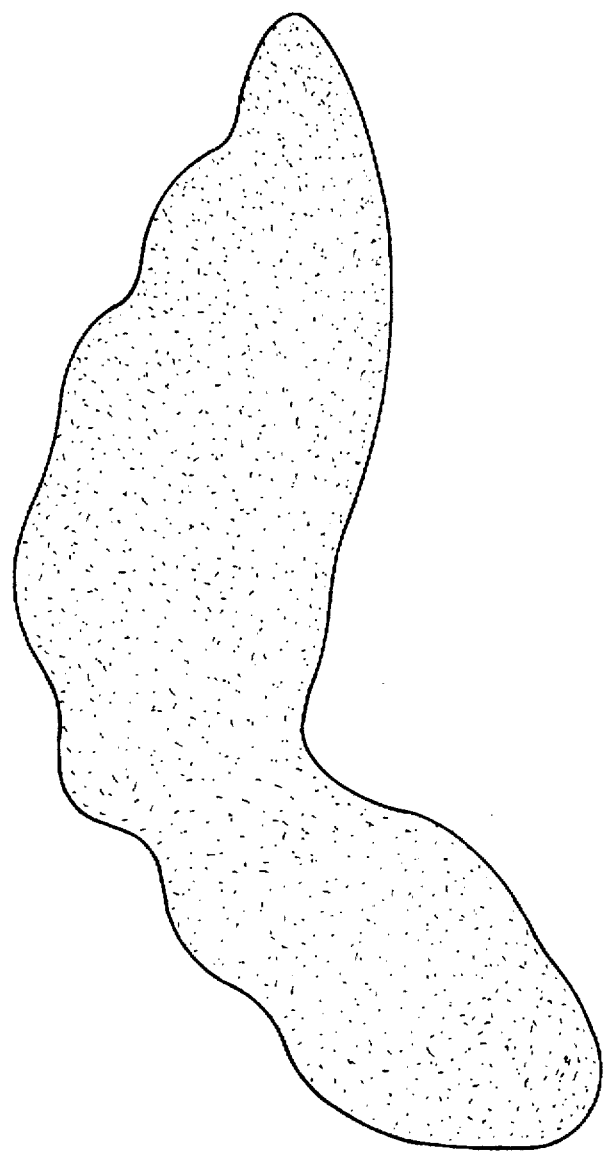
FIG. 31 shows an example in accordance with the example 3, and is a view showing a printed result obtained from processed data based on the B-spline curve in FIG. 25.
Figure 32:
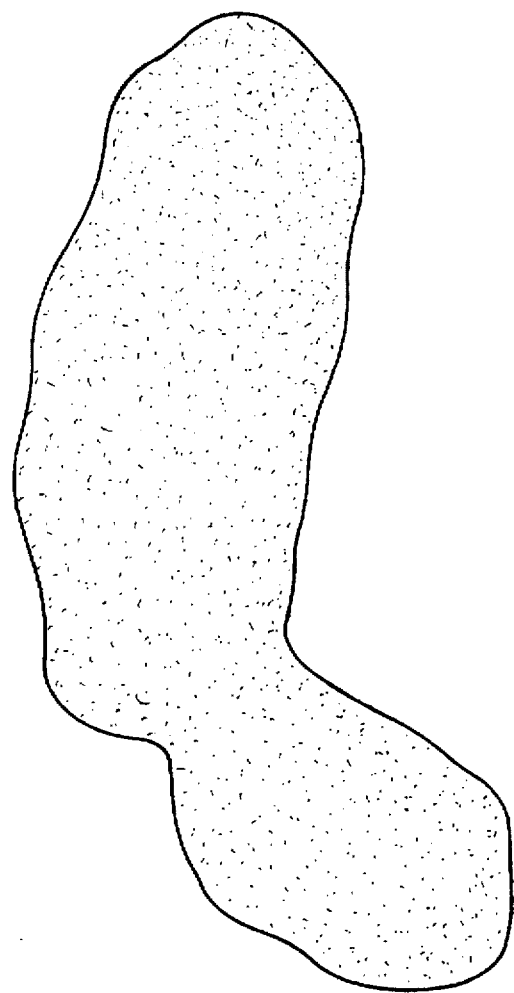
FIG. 32 shows an example in accordance with the example 3, and is a view showing a printed result obtained from processed data based on the Bejie curve in FIG. 26.
Figure 33:
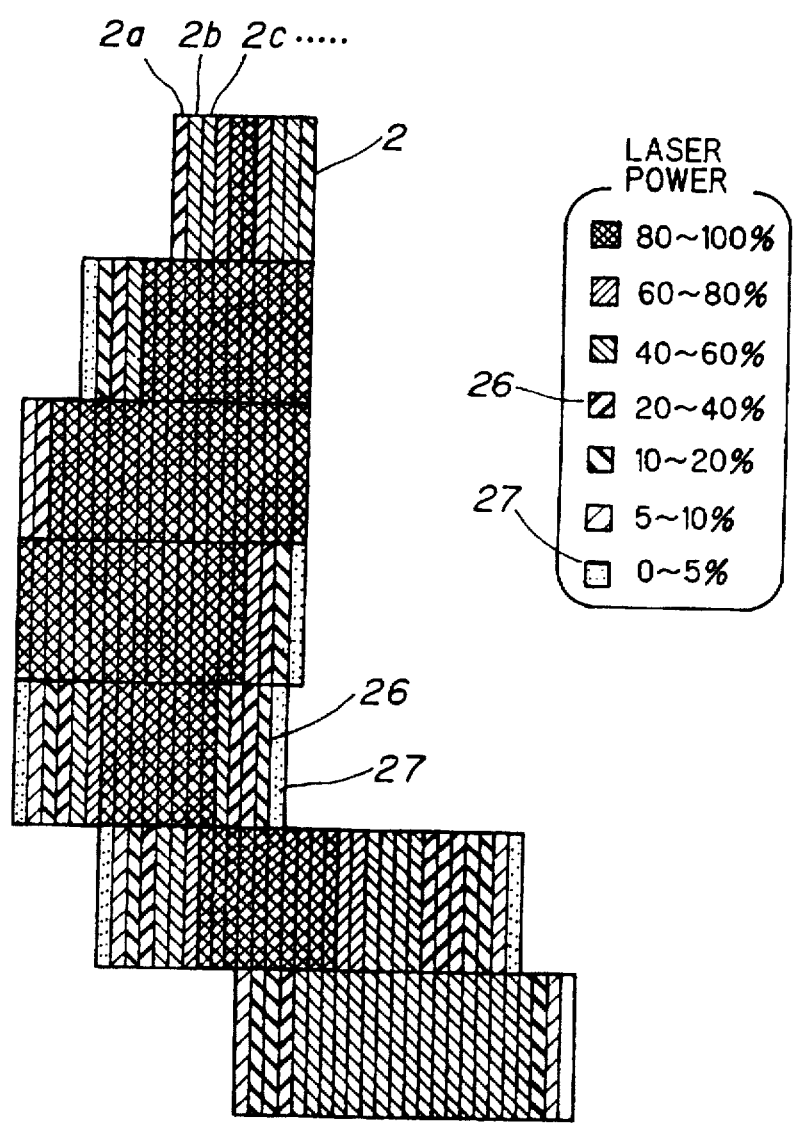
FIG. 33 shows an example in which laser beams are controlled by the combination of the pulse-width modulation and the power modulation and is a view showing an example of setting up power for each sub-pixel to be exposed to laser beams (based on a B-spline curve)

Based on the thus obtained sub-dot data, the laser exposure will be done. FIGS. 31 and 32 show the output print images obtained in accordance with the above scheme.

In the above method (2), the proportion (or area) of the area enclosed by the curve 4 or 5 in every sub-pixel to the total area of the sub-pixel is determined, and based on the thus determined area, pulse widths of the laser beams are set up for all the sub-dots (2a, 2b . . . ). That is, the pulse width is controlled by the pulse-width modulation alone. In the present invention, it is also possible, however, to control laser pulses by using the power modulation together with the pulse-width modulation. In other words, based on the curve-enclosed area 4a or 5a in every sub-pixel 2a, 2b . . . , the power of the semiconductor laser may be set up.

Figure 34:
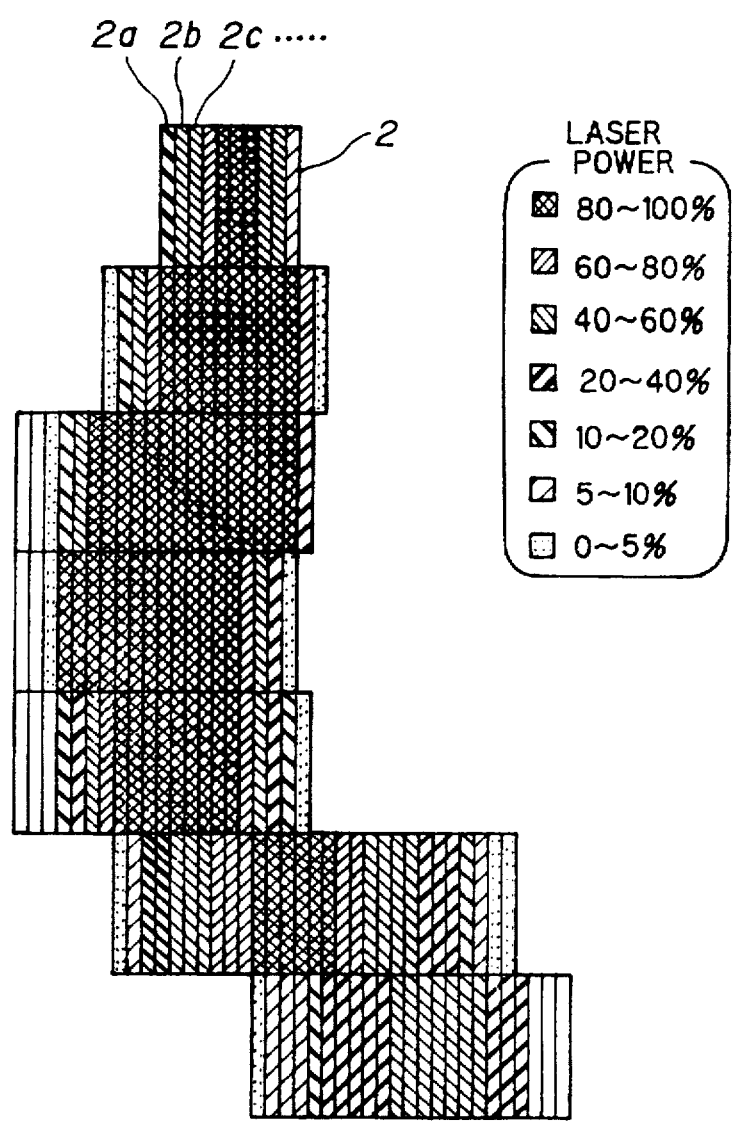
FIG. 34 shows an example of controlling laser beams by the combination of the pulse-width modulation and the power modulation and is a view showing an example of setting up power for each sub-pixel to be exposed to laser beams (based on a Bejie curve)
Figure 35:
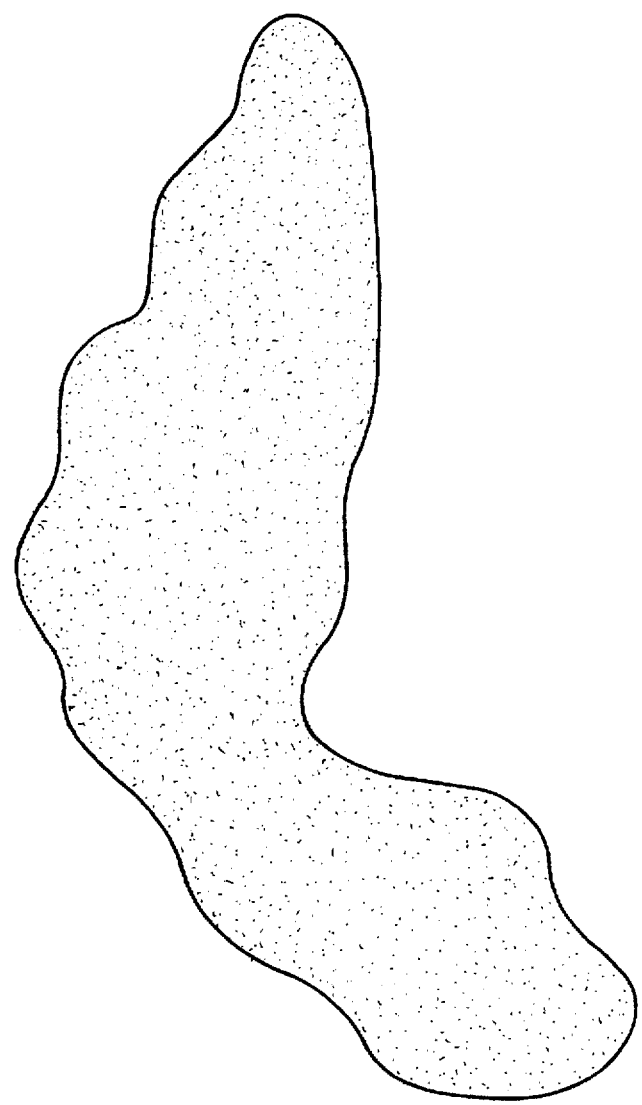
FIG. 35 is a view showing a printed result of the example shown in FIG. 33 (based on the B-spline curve)
Figure 36:
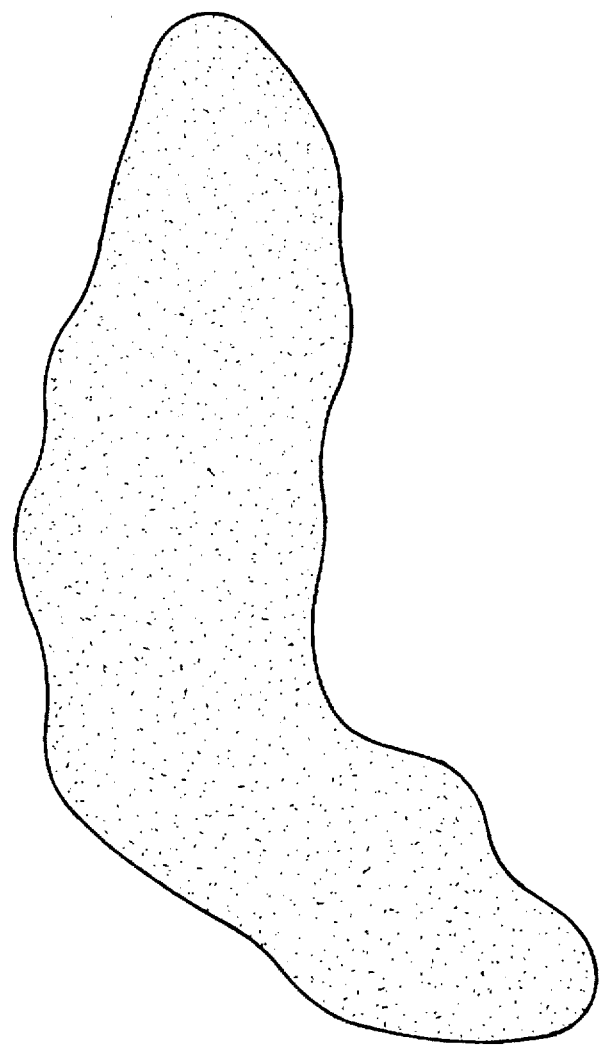
FIG. 36 is a view showing a printed result of the example shown in FIG. 34 (based on the Bejie curve)
Figure 37:
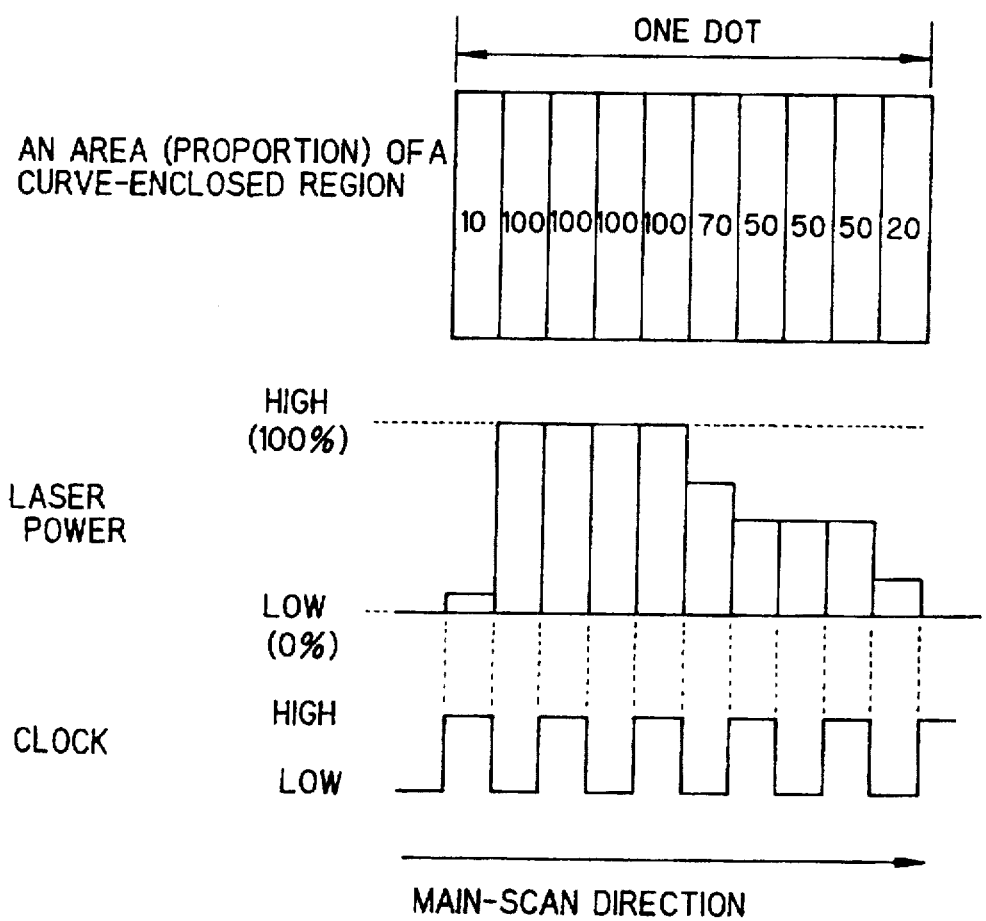
FIG. 37 shows an example in which laser beams are controlled by the combination of the pulse-width modulation and the power modulation and is a view showing an example of output of laser beams.

FIG. 34 shows an example for easy understanding of this operation. Here, the power of the semiconductor laser is adapted to be variable step-wise from 0 to 100, and the determined value of the curve-enclosed area for each sub-pixel is used as the power of laser beams. For example, the curve-enclosed area in a sub-pixel 26 is five, so that the power of the semiconductor laser is set up to be five. The curve-enclosed area in a sub-pixel 27 is twelve, so that the power of the semiconductor laser is set up to be twelve (see FIGS. 33 and 34). When curve-enclosed areas for sub-pixels in one pixel are specified as the top figure in FIG. 37, the semiconductor laser is controlled in its laser power in accordance with the curve-enclosed areas for the sub-pixels 2a, 2b . . . , as shown in the middle figure. With this process, it is possible to obtain print images having less jaggedness as seen in FIGS. 35 and 36.

If unprocessed values of the curve-enclosed areas cannot be used for setting up the power steps of the semiconductor laser, the above values of the curve-enclosed areas may be used as coefficients to determine power output. With this process, it is possible to obtain a proper amount of light energy for every pixel (sub-pixel).

Figure 38:
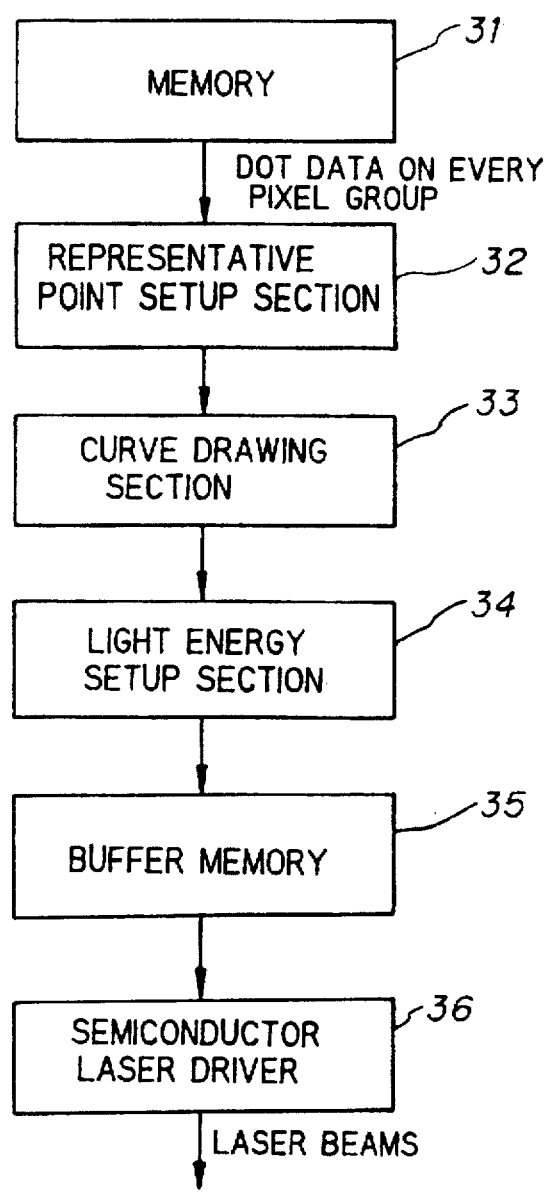
FIG. 38 is a block diagram showing an exposure controlling portion in a laser printer to which the present invention is applied.

FIG. 38 is a block diagram showing the flow of the exposure control in the laser printer having the above exposure controlling method.

A memory 31 stores data for printing, inclusive of pixel groups of characters etc. A representative point setup section 32, retrieves pixel group data (dot data) such as 'one-character pixel group data' etc., from the memory 31, and adds right and left-representative points 3a and 3b. A curve-drawing section 33 draws a curve 4 by the B-spline method or curve 5 by the Bejie method with reference to the right and left-representative points 3a and 3b. As to this operation, it possible to set up the system in such a manner that any one of the curve-fitting approximation method may be selected in accordance with the type of the pixel group, based on a preset selecting rule of the curve-fitting approximation methods which is previously determined in accordance with the types of pixel groups. For example, it is possible to set up the system so that, when a pixel group is of a character, the B-spline curve-fitting approximation will be selected while if a pixel group is of pattern data, the Bejie curve-fitting approximation will be used. A light energy determining section 34 determines pulse widths or pulse power of the semiconductor laser based on any one of the methods (1) through (3), with reference to the curve 4 or 5 and sends the data to a buffer memory 35. In printing, data to be printed is processed repeatedly through the sequence of the representative point setup section 32, curve-drawing section 33 and light energy determining section 34 until all the data processing is completed. After the completion of data processing, a semiconductor driver 36 loads the data from the buffer memory 35 to effect a printing operation.

As is apparent from the foregoing detailed description with reference to the drawings, in accordance with the first embodiment, the method of the present invention will not require any pattern matching process as used to be effected in the conventional configuration, so that it is possible to shorten the processing time and there is no more necessity for previously storing pattern matching data. Further, since the amount of light energy is controlled for every pixel based on a curve formed by one of the curve-fitting approximation methods, it is possible to alleviate generation of jaggedness.

In accordance with the second and third embodiments, since contours of image elements on the output image are formed to run along the curve, jaggedness can be alleviated whereby it is possible for even a low-resolution printer to obtain a good quality image. Thus, image quality can be improved by software processing, therefore it is possible to reduce the cost of the hard (printer) host.

Use of the apparatus of the present invention, makes it possible for a low-cost, low-resolution printer to obtain a good image with little jaggedness.

What is claimed is:

1. An exposure controlling method for use in a laser printer whereby an amount of light energy of laser beams irradiated on a photoreceptor is controlled for every pixel to form a latent image, comprising the steps of:

determining representative points based on the positions of peripheral pixels in each black pixel group made up of at least one or more black pixels;

depicting a curve by a curve-fitting approximation method based on the representative points; and controlling the amount of light energy for every pixel based on said curve.

2. An exposure controlling method according to claim 1, wherein said control of the amount of light energy for every pixel based on said curve is effected in such a manner that every black pixel is divided into a plurality of sub-pixels and only the sub-pixels existing inside said curve are illuminated by the laser beams.

3. An exposure controlling method according to claim 1, wherein said control of the amount of light energy for every pixel based on said curve is effected in such a manner that every black pixel is divided into a plurality of sub-pixels and the number of sub-pixels to be exposed to the laser beams is set up based on a proportion of an area belonging to the inside of said curve in one black pixel to the total area of the pixel in question.

4. An exposure controlling apparatus for use in a laser printer whereby an amount of light energy of laser beams irradiated on a photoreceptor is controlled for every pixel to form a latent image, comprising:

representative point setup means for picking up black pixel groups each consisting of at least one or more black pixels and determining representative points based on the positions of peripheral pixels in each black pixel group;

curve drawing means for forming a curve for each of said pixel groups by joining said representative points by a curve-fitting approximation method; and means for determining laser output conditions for controlling the amount of light energy to be irradiated on each pixel based on said curve.

5. An exposure controlling method according to claim 1, wherein said controlling step comprises controlling a pulse-width modulation of the laser beams.

6. An exposure controlling method according to claim 1, wherein said controlling step comprises controlling a power modulation of the laser beams.

7. An exposure controlling method according to claim 1, wherein said controlling step comprises controlling a pulse-width modulation and a power modulation of the laser beams.

8. An exposure controlling method according to claim 1, wherein said depicting step comprises depicting a curve in accordance with a B-spline curve-fitting approximation method.

9. An exposure controlling method according to claim 1, wherein said depicting step comprises depicting a curve in accordance with a Bejie curve-fitting approximation method.

10. An exposure controlling method according to claim 1, further comprising, after said representative point determining step, the step of shifting the representative points to respective peripheral positions within each peripheral pixel.

11. An exposure controlling apparatus according to claim 4, wherein said laser output conditions comprise a pulse-width modulation of the laser beams.

12. An exposure controlling apparatus according to claim 4, wherein said laser output conditions comprise a power modulation of the laser beams.

13. An exposure controlling apparatus according to claim 4, wherein said laser output conditions comprise a pulse-width modulation and a power modulation of the laser beams.

14. An exposure controlling apparatus for a printing device whereby an amount of light energy of laser beams irradiated on a photoreceptor is controlled for every pixel to form a latent image, comprising:

a memory storing data for printing;

a representative point setup section communicating with said memory, said representative point setup section retrieving pixel group data from said memory and adding right- and left-representative points based on positions of peripheral pixels in the pixel group;

a curve drawing section communicating with said representative point setup section, said curve drawing section drawing a curve in accordance with a predetermined curve-fitting approximation method; and a light energy determining section communicating with said curve drawing section, said light energy determining section determining light energy for the laser beams based on the curve for each pixel in the pixel group.

15. An exposure controlling apparatus according to claim 14, wherein said predetermined curve-fitting approximation method is a B-spline curve-fitting approximation method.

16. An exposure controlling apparatus according to claim 14, wherein said predetermined curve-fitting approximation method is a Bejie curve-fitting approximation method.

17. An exposure controlling apparatus according to claim 14, wherein said light energy determining section comprises a pulse-width modulator that modulates a pulse-width of the laser beams in accordance with the curve.

18. An exposure controlling apparatus according to claim 14, wherein said light energy determining section comprises a power modulator that modulates a power output of the laser beams in accordance with the curve.

19. An exposure controlling apparatus according to claim 14, wherein said light energy determining section comprises a pulse-width modulator and a power modulator that modulates a pulse-width and a power output of the laser beams, respectively, in accordance with the curve.

20. An exposure controlling method for use in a laser printer whereby an amount of light energy of laser beams irradiated on a photoreceptor is controlled for every pixel to form a latent image, comprising the steps of:

determining representative points based on the positions of peripheral pixels in each black pixel group made up of at least one or more black pixels;

shifting the representative points to respective peripheral positions within each pixel to thereby define a contour of the pixel group;

depicting a curve by a curve-fitting approximation method in accordance with the representative points and the contour of the pixel group; and controlling the amount of light energy for every pixel based on said curve.

* * * * *